United States Patent
Gray, Jr. et al.

(10) Patent No.: US 8,801,073 B1
(45) Date of Patent: Aug. 12, 2014

(54) LUGGAGE RETENTION SYSTEM

(71) Applicants: Carl L. Gray, Jr., Sterling Heights, MI (US); Adam Sachs, Oak Park, MI (US); Johnathan Andrew Line, Northville, MI (US)

(72) Inventors: Carl L. Gray, Jr., Sterling Heights, MI (US); Adam Sachs, Oak Park, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/786,568

(22) Filed: Mar. 6, 2013

(51) Int. Cl.
*B60R 7/02* (2006.01)

(52) U.S. Cl.
CPC ...................................... *B06N 2/206* (2013.01)
USPC ... 296/37.1; 296/37.5; 296/37.16; 296/65.17; 296/24.33; 296/24.44; 297/188.02; 297/378.12; 297/378.14; 224/314; 224/549

(58) Field of Classification Search
CPC .......................................................... B60R 7/02
USPC .............. 296/24.33, 24.43, 24.44, 37.1, 37.5, 296/37.7, 37.16, 65.16, 65.17, 68, 68.1; 224/275, 309, 311, 314, 318, 539, 549, 224/564; 297/14, 15, 188.01, 188.02, 297/188.08, 188.09, 188.1, 378.1, 378.11, 297/378.12, 378.13, 378.14
IPC .......................................................... B60R 7/02
See application file for complete search history.

(56) References Cited

U.S. PATENT DOCUMENTS

| | | | |
|---|---|---|---|
| 2,532,909 A | 12/1950 | Hart | |
| 3,240,527 A * | 3/1966 | Weiss et al. | ................. 296/24.43 |
| 4,270,790 A | 6/1981 | Curotto | |
| 4,881,673 A | 11/1989 | Kapp | |
| 5,392,972 A | 2/1995 | Caruso et al. | |
| 5,570,921 A | 11/1996 | Brooker | |
| 5,713,502 A * | 2/1998 | Dixon | ........................... 224/542 |
| 6,050,202 A | 4/2000 | Thompson | |
| 6,053,553 A | 4/2000 | Hespelt | |
| 6,065,794 A * | 5/2000 | Schlachter | ................... 296/37.6 |
| 6,092,704 A * | 7/2000 | Baumeister | ................... 224/275 |
| 6,253,943 B1 | 7/2001 | Spykerman et al. | |
| 6,336,670 B1 * | 1/2002 | Sav.ang.s | ................... 296/37.16 |
| 6,467,828 B1 | 10/2002 | Grydbeck et al. | |

(Continued)

FOREIGN PATENT DOCUMENTS

| | | |
|---|---|---|
| EP | 0713805 | 5/1996 |
| EP | 1120315 | 8/2001 |
| JP | 137645 | 6/2010 |

*Primary Examiner* — Glenn Dayoan
*Assistant Examiner* — Jason S Daniels
(74) *Attorney, Agent, or Firm* — Vichit Chea; Price Heneveld LLP

(57) ABSTRACT

A motor vehicle luggage retention system for a motor vehicle is disclosed. A foldable seat back separates the occupant compartment from the trunk and has an upright position and a folded position that allows pass-through accessibility from the trunk into the occupant compartment. A pivotable bar assembly in the trunk has a lowered position and a raised position. Pivoting the pivotable bar assembly to the lowered position moves the foldable seat back to the upright position and creates a structural safety barrier against objects in the trunk impacting a rear surface of the seat back. Pivoting the pivotable bar assembly to the raised position moves the seat back to the folded position to provide uninterrupted access to the occupant compartment from the trunk. A latch assembly latches the pivotable bar assembly in at least the lowered position. A movable parcel shelf and collapsible storage bin are also disclosed.

19 Claims, 31 Drawing Sheets

(56) References Cited

U.S. PATENT DOCUMENTS

| | | |
|---|---|---|
| 6,502,731 B1 | 1/2003 | Gehring et al. |
| 6,546,598 B1 | 4/2003 | Nakanou et al. |
| 6,874,667 B2 | 4/2005 | Dykstra et al. |
| 7,073,836 B2 | 7/2006 | Haspel |
| 7,131,681 B2 | 11/2006 | Kim |
| 7,665,790 B2 | 2/2010 | Oino |
| 7,931,177 B2 | 4/2011 | Bohlke et al. |
| 7,938,471 B2 | 5/2011 | Karaki et al. |
| 2004/0188481 A1* | 9/2004 | McKenzie et al. ............ 224/539 |
| 2005/0145659 A1 | 7/2005 | Mulvihill |
| 2007/0187969 A1 | 8/2007 | Dowd et al. |
| 2011/0204668 A1 | 8/2011 | Pauken |
| 2013/0249232 A1* | 9/2013 | Dinger et al. ............... 296/37.5 |

* cited by examiner

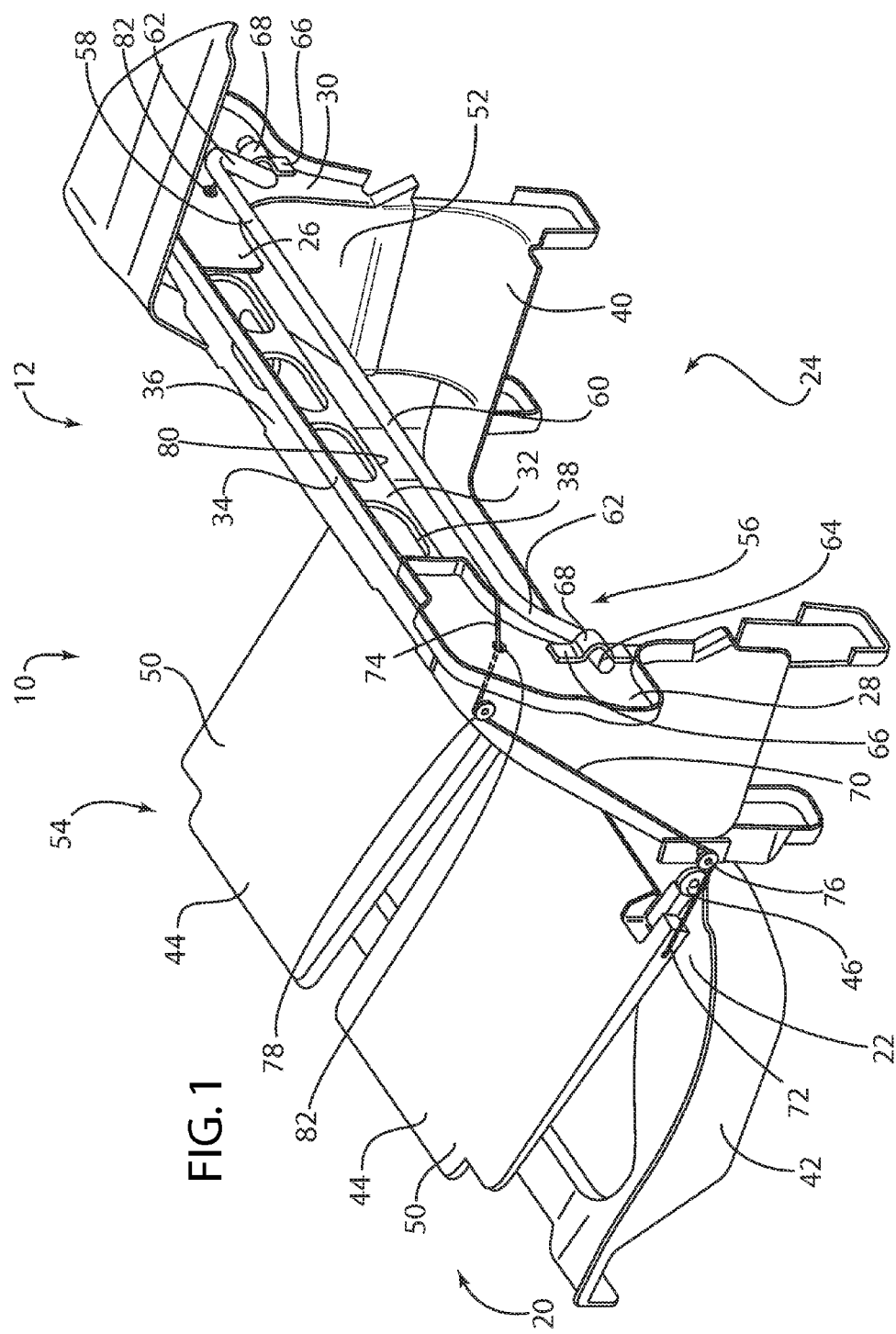

LUGGAGE RETENTION SYSTEM

FIELD OF THE INVENTION

The present disclosure generally relates to a luggage retention system for use with motor vehicle foldable seat assemblies adapted to interact with and operate a seat assembly and related stowage options.

BACKGROUND OF THE INVENTION

Seat assemblies for use in motor vehicles are generally well-known in the art. In many motor vehicles, particularly in sedans having rear seating, upright seat backs used in the second row or rear seats are used to separate the passenger compartment from the rear trunk, which is otherwise accessible via a trunk lid or deck. This arrangement tends to minimize noise in the passenger compartment, as well as allowing the separate storage and transportation of luggage and other items in the trunk. Given the fact that items stowed in the trunk tend to move about within the trunk unless otherwise restrained, the upright rear seat backs tend to be rather robustly designed in order to tolerate the impact of a heavy item in the trunk against the upright rear seat backs, for example, caused by the sudden application of the motor vehicle braking system during a so-called "panic stop" or in the event of a frontal impact. Such robust structures, however, add weight and cost the motor vehicle.

Further, in more recent years, it has become common to configure the rear seat backs to fold or rotate forward about a pivot in order to create an opening between the passenger compartment and the trunk, which is especially useful when needed to transport long items that would not otherwise fit in the trunk, such as skis, lumber, and gardening tools. When in the upright position, such foldable rear seats function in the normal manner and create a standard rear seat back for vehicle occupants, often having a frontal upholstered portion that matches the vehicle seating upholstery. Typically, the rear seat backs are latched into the upright position. When the latch is released, and the seat back is moved by the vehicle operator to the folded position, the rear seat back essentially forms a continued floor for the trunk extending forward into the vehicle. The rear portion of the seat back is typically covered with a carpet to match that of the trunk so as to form an extended cargo or luggage area that allows for pass-through accessibility for long items over the rear seat backs and into the occupant compartment.

However, such systems experience certain drawbacks. For example, in such arrangements, given the constraints imposed by vehicle packaging and layout considerations, it is often difficult to provide a convenient latch release mechanism for the foldable rear seat backs that may be readily operable by the vehicle operator. Moreover, in such foldable rear seat back systems, the robust structures that are needed to protect the occupant compartment from items in the trunk with the rear seat back in the upright position tend to add mass and bulk to the rear seat back assemblies, rendering the rear seat backs difficult to operate and move between the upright and folded positions.

Further, trunk space is an important consideration in vehicle design. Limited trunk space hinders the usability of the trunk. Additionally, the storage and transportation of delicate items, such as laptop computers, is often problematic, and prevents access to the functional capabilities of such laptop computers while the vehicle is in use. An area designated for the safe storage area for tablets and laptops that locks them securely in place is lacking. Finally, vehicle operators often store loose items in the trunk that have a tendency to move around throughout the trunk, creating noise and potentially damaging the trunk.

Hence, a luggage retention system which overcomes these drawbacks would be advantageous.

SUMMARY OF THE INVENTION

The luggage retention system disclosed herein particularly accomplishes the foregoing by adapting the present typical motor vehicle seat to incorporate a luggage retention system that operates a rear seat, comprising a generally horizontal seating structure and a foldable seat back separating the occupant compartment from the trunk foldable about a pivot, the foldable seat back forming a standard seat back for vehicle occupants when in an upright position and the foldable seat back creating a substantially continuous surface with the trunk when in a folded position. Moving the foldable seat back to the folded position forms an opening between the occupant compartment and the trunk and an extended luggage area that allows for pass-through accessibility from the trunk over the foldable seat back and into the occupant compartment. A pivotable bar assembly is mounted in the trunk and has a lowered position and a raised position operatively connected to the foldable seat back for moving the foldable seat back between the upright position and the folded position. Pivoting the pivotable bar assembly to the lowered position moves the foldable seat back to the upright position and creates a structural safety barrier against objects in the trunk impacting a rear surface of the seat back. Pivoting the pivotable bar assembly to the raised position moves the seat back to the folded position to provide uninterrupted access to the occupant compartment from the trunk. A latch assembly latches the pivotable bar assembly in at least the first lowered position.

A further aspect of the present disclosure is a luggage retention system having a U-shaped bar with a linear central portion and a pair of matching ends forming opposed mounting lugs having an axis offset from the linear central portion, a pair of mounting brackets pivotably securing each of the mounting lugs to a pair of mounting plates located in the trunk on opposite sides of the opening between the occupant compartment and the trunk, and a cable having a first end attached to or proximate the linear central portion of the U-shaped bar and a second end attached to the foldable seat back.

Another aspect of the invention is a luggage retention system further including a first pulley mounted proximate the pivot, a second pulley mounted proximate an upper edge of the opening between the occupant compartment and the trunk, and a cable routing hole through the mounting plate in the trunk, wherein the cable travels under the first pulley, over the second pulley, and through the routing hole when pivoting the pivotable bar assembly between the first lowered position and the second raised position.

Still another aspect of the present disclosure is a luggage retention system where the latch assembly comprises a first portion provided on at least one of the mounting lugs and a second portion provided on at least one of the brackets retaining the mounting lug, with the first portion engaging the second portion.

Yet another aspect of the present disclosure is a luggage retention system wherein the bracket comprises at least one flat plate extending perpendicularly to the mounting lug and having a mounting opening within which the mounting lug is received. The first portion of the latch assembly is a bent tab, and the second portion of the latch assembly is a semi-circular slot within the flat plate concentric with the mounting opening, the bent tab having a first leg extending radially from the mounting lug and a second leg extending parallel to the mounting lug and extending into the semi-circular slot. The latching assembly allows rotational motion of the U-shaped bar between the lowered position and the raised position and latching the U-shaped bar in the lowered position.

An additional aspect of the present disclosure is a luggage retention system that restrains the foldable seat back when in the upright position, wherein unlatching the latching assembly and pivoting the pivotable bar assembly from the lower position simultaneously releases the foldable seat back.

Another aspect of the present disclosure is a foldable seat back having an upright position and a folded position, a pivotable bar assembly mounted aft of the seat back having a lowered position moving the foldable seat back to the upright position and a raised position moving the foldable seat back to the folded position, and a latch assembly for locking the pivotable bar assembly in the lowered position.

A further aspect of the present disclosure is a method of retaining luggage and other cargo in motor vehicle comprising an occupant compartment having a rear seat and a trunk rearward of the rear seat, the rear seat comprising a generally horizontal seating structure and a foldable rear seat back separating the occupant compartment from the trunk foldable about a pivot, the foldable rear seat back forming a standard rear seat back for vehicle occupants when in an upright position, and the foldable rear seat back creating a substantially continuous surface with the trunk when in a folded position so as to form an opening between the occupant compartment and the trunk and an extended luggage area that allows for pass-through accessibility from the trunk over the foldable rear seat back and into the occupant compartment. The method comprises the steps of mounting a pivotable bar assembly pivotable between a lowered position and a raised position in the trunk, operatively connecting the pivotable bar assembly to the foldable rear seat back for moving the foldable rear seat back between the upright position and the folded position, pivoting the pivotable bar assembly to the raised position to move the rear seat back to the folded position to provide uninterrupted access to the occupant compartment from the trunk, pivoting the pivotable bar assembly to the lowered position to move the foldable rear seat back to the upright position and create a structural safety barrier against objects in the trunk impacting a rear surface of the rear seat back, and latching the pivotable bar assembly when in the lowered position.

Another aspect of the present disclosure is a parcel storing system for a motor vehicle comprising an occupant compartment having a seat and a trunk rearward of the seat, the seat comprising a generally horizontal seating structure and a foldable seat back separating the occupant compartment from the trunk foldable about a pivot, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment. A pivotable bar assembly is mounted in the trunk having a lowered position and a raised position operatively connected to the foldable seat back for moving the foldable seat back between the upright position and the folded position. Pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk. A parcel shelf is mounted to the pivotable bar assembly and is movable between an accessible position when the pivotable bar assembly is in the lowered position and a stowed position when the pivotable bar assembly is the raised position. A latch assembly latches the pivotable bar assembly in at least the lowered position.

A further aspect of the present disclosure is a parcel storing system further comprising a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the parcel shelf has a substantially planar section and a hinge section interconnected to the planar section via a hinge, the hinge section comprising a rearward edge pivotably attached to the linear central portion of the U-shaped bar.

Yet a further aspect of the present disclosure is a parcel storing system further comprising a bulkhead having a horizontal cross member partially separating the occupant compartment from the trunk and wherein the parcel shelf further comprises a forward edge pivotably attached to the horizontal cross member.

A still further aspect of the present disclosure is a parcel storing system where the hinge between the substantially planar section and the hinge section of the parcel shelf is a piano hinge provided with a plurality of slots that cooperate with and are received by corresponding knuckles.

Yet another aspect of the present disclosure is a parcel storing system where the forward edge of the parcel shelf is pivotably attached to the horizontal cross member by a piano hinge member, the forward edge of the parcel shelf being provided with a plurality of slots that cooperate with and are received by corresponding knuckles extending from the piano hinge member.

Another aspect of the present disclosure is a parcel storing system the parcel shelf is parallel to and proximate with the bulkhead cross member in the stowed position, allowing full access to the opening and the occupant compartment.

A further aspect of the present disclosure is a parcel storing system where the hinge section of the parcel shelf folds against and is substantially parallel to the planar section of the parcel shelf when in the stowed position to allow full access to the opening and the occupant compartment.

A still further aspect of the present disclosure is a parcel storing system where the knuckles of the hinge between the planar section and the hinge section provided on the planar section have a larger diameter than the thickness of the planar section such that the hinge section of the parcel shelf folds against and is substantially parallel to the planar section of the parcel shelf when in the stowed position to allow full access to the opening and the occupant compartment.

Another aspect of the present disclosure is a parcel storing system where the parcel shelf is provided with a recess for storing articles that are accessible when the pivotable bar assembly is in the lowered position and are physically inaccessible when the pivotable bar assembly is the raised position.

According to another aspect of the present disclosure is a parcel storing system where the recess is adapted to accept and restrain a tablet computer in either position.

Still another aspect of the present disclosure is a parcel storing system where the recess further has a computer data port for connecting the tablet computer to a computer system for the motor vehicle and integrated the tablet computer into the motor vehicle computer system for safe, hands-free, and voice-activated operation.

A further aspect of the present disclosure is a parcel storing system comprising a parcel shelf mounted to a pivotable bar assembly disposed aft of a motor vehicle seat back, the pivotable bar assembly having a lowered position moving the parcel shelf to an accessible position and a raised position moving the parcel shelf to a stowed position, and a latch assembly for releasably latching the pivotable bar assembly in the lowered position.

According to another aspect of the present disclosure is a method of storing articles in a motor vehicle having an occupant compartment with a foldable seat back and a trunk rearward of the foldable seat back, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment. The method includes the steps of mounting a pivotable bar assembly in the trunk having a lowered position and a raised position operatively connected to the foldable seat back for moving the foldable seat back between the upright position and the folded position, wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk, mounting a parcel shelf to the pivotable bar assembly, moving the parcel shelf between an accessible position when the pivotable bar assembly is in the lowered position and a stowed position when the pivotable bar assembly is the raised position, and latching the pivotable bar assembly in at least the lowered position.

Another aspect of the invention is a storage system for a motor vehicle comprising an occupant compartment having a seat and a trunk rearward of the seat, the seat comprising a generally horizontal seating structure and a seat back separating the occupant compartment from the trunk foldable about a pivot, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment. A pivotable bar assembly is mounted in the trunk having a lowered position and a raised position operatively connected to the foldable seat back for moving the foldable seat back between the upright position and the folded position, wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk. A collapsible storage bin mounted to the pivotable bar assembly is movable between an expanded and deployed position when the pivotable bar assembly is in the lowered position and a collapsed and stowed position when the pivotable bar assembly is the raised position. A latch assembly for latching the pivotable bar assembly in at least the lowered position.

Still another aspect of the present disclosure is a storage system wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls, and a foldable bottom, one of the rigid side walls having an upper edge pivotably attached to the linear central portion of the U-shaped bar.

Yet another aspect of the present disclosure is a storage system wherein the linear central portion of the U-shaped bar has a circular cross-sectional portion and the upper edge of the one of the rigid side walls further comprises a plurality of sequential openings through which a plurality of eyehooks pivotably attaches the collapsible storage bin to the circular cross-sectional portion of the U-shaped bar.

Still another aspect of the present disclosure is a storage system wherein each of the plurality of eyehooks comprise a collar having an opening fittingly and rotatably receiving the circular cross-sectional portion of the U-shaped bar and a depending hook removably extending from the collar into and through one of the plurality of openings in the upper edge of the one of the rigid side walls.

Yet a further aspect of the present disclosure is a storage system further comprising a bulkhead having a horizontal cross member partially separating the occupant compartment from the trunk and wherein the collapsible storage bin is disposed beneath the horizontal cross member when in the stowed position.

Yet a further aspect of the present disclosure is a storage system wherein the collapsible storage bin is parallel to and proximate with the bulkhead horizontal cross member in the stowed position, allowing full access to the opening and the occupant compartment.

According to another aspect of the present disclosure is a storage system comprising a collapsible storage bin mounted to a pivotable bar assembly disposed aft of a motor vehicle seat back, the pivotable bar assembly having a lowered position moving the collapsible storage bin to an expanded and deployed position and a raised position moving the collapsible storage bin to a collapsed and stowed position, and a latch assembly for releasably latching the pivotable bar assembly in the lowered position.

A still further aspect of the present disclosure is a storage system wherein the collapsible storage bin is removable from the pivotable bar assembly for use as a basket to transport items to and from the motor vehicle.

A further aspect of the present disclosure is a storage system further comprising a parcel shelf and a collapsible storage bin mounted to the pivotable bar assembly and movable between an accessible position when the pivotable bar assembly is in the lowered position and a stowed position when the pivotable bar assembly is the raised position.

An additional aspect of the present disclosure is a storage system wherein the parcel shelf and the collapsible storage bin in the stowed position allow full access to the opening and the occupant compartment.

Another aspect of the present disclosure is a storage system wherein the collapsible storage bin rests on the parcel shelf when in the stowed position.

Still another aspect of the present disclosure is a method of storing articles in a motor vehicle having an occupant compartment with a foldable seat back and a trunk rearward of the foldable seat back, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment, the method including the steps of mounting a pivotable bar assembly in the trunk having a lowered position and a raised position operatively connected to the foldable seat back for moving the foldable seat back between the upright position and the folded position, wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk, mounting a collapsible storage bin to the pivotable bar assembly, moving the collapsible storage bin between an expanded and collapsed condition when the pivotable bar assembly is in the lowered position, moving the collapsible storage bin between a deployed lowered position when the pivotable bar assembly is in the lowered position and a stowed upper position when the pivotable bar assembly is the raised position, and latching the pivotable bar assembly in at least the lowered position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a perspective rear view of a motor vehicle incorporating the luggage retention system in accordance with the present disclosure with the rear seat backs in the folded position and the U-shaped bar in the raised position;

DETAILED DESCRIPTION OF THE PREFERRED EMBODIMENTS

Figure 1A:
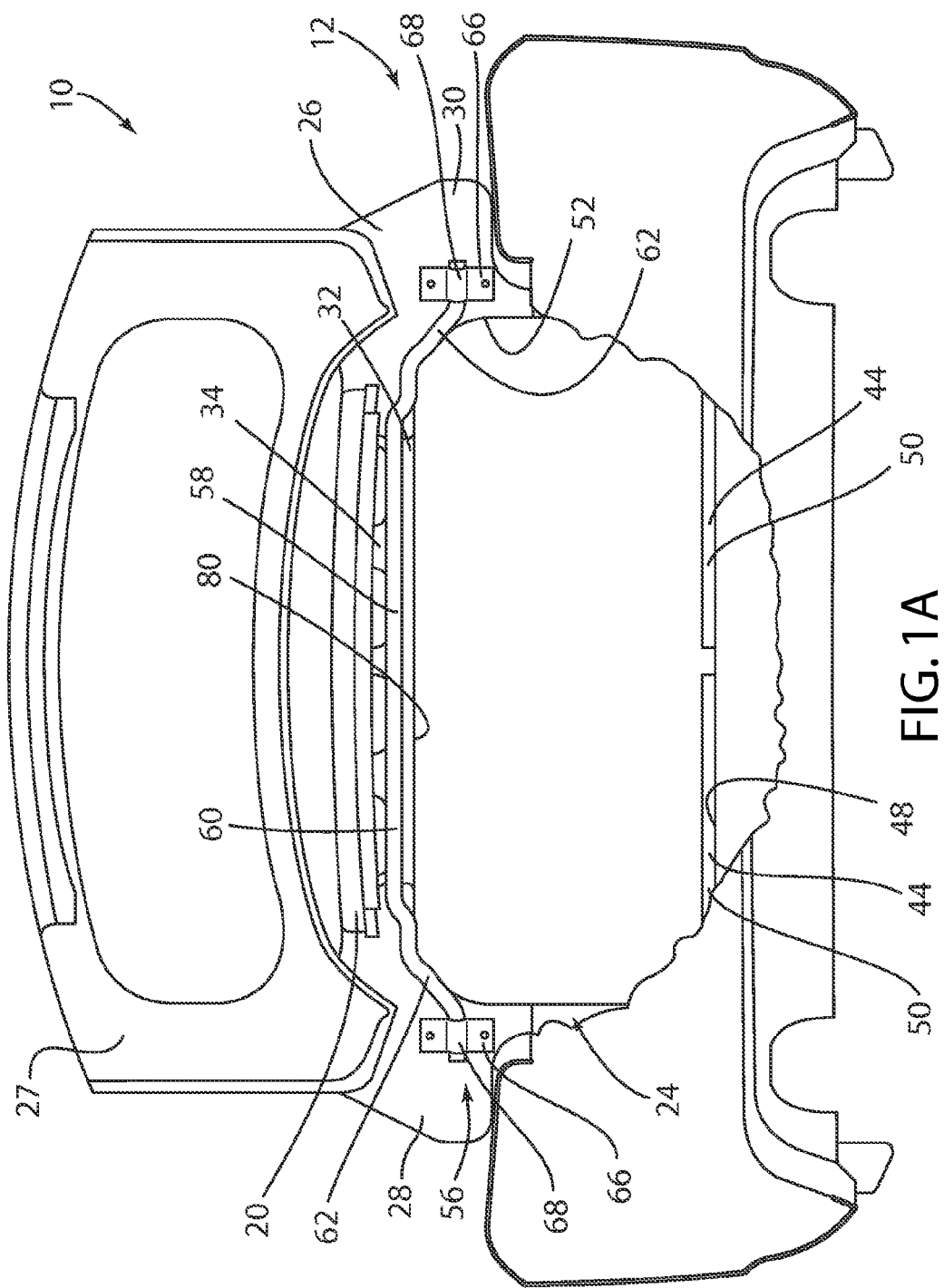
FIG. 1A is a rear plan view of a motor vehicle incorporating the luggage retention system in accordance with the present disclosure with the rear seat backs in the folded position and the U-shaped bar in the raised position.
Figure 2:
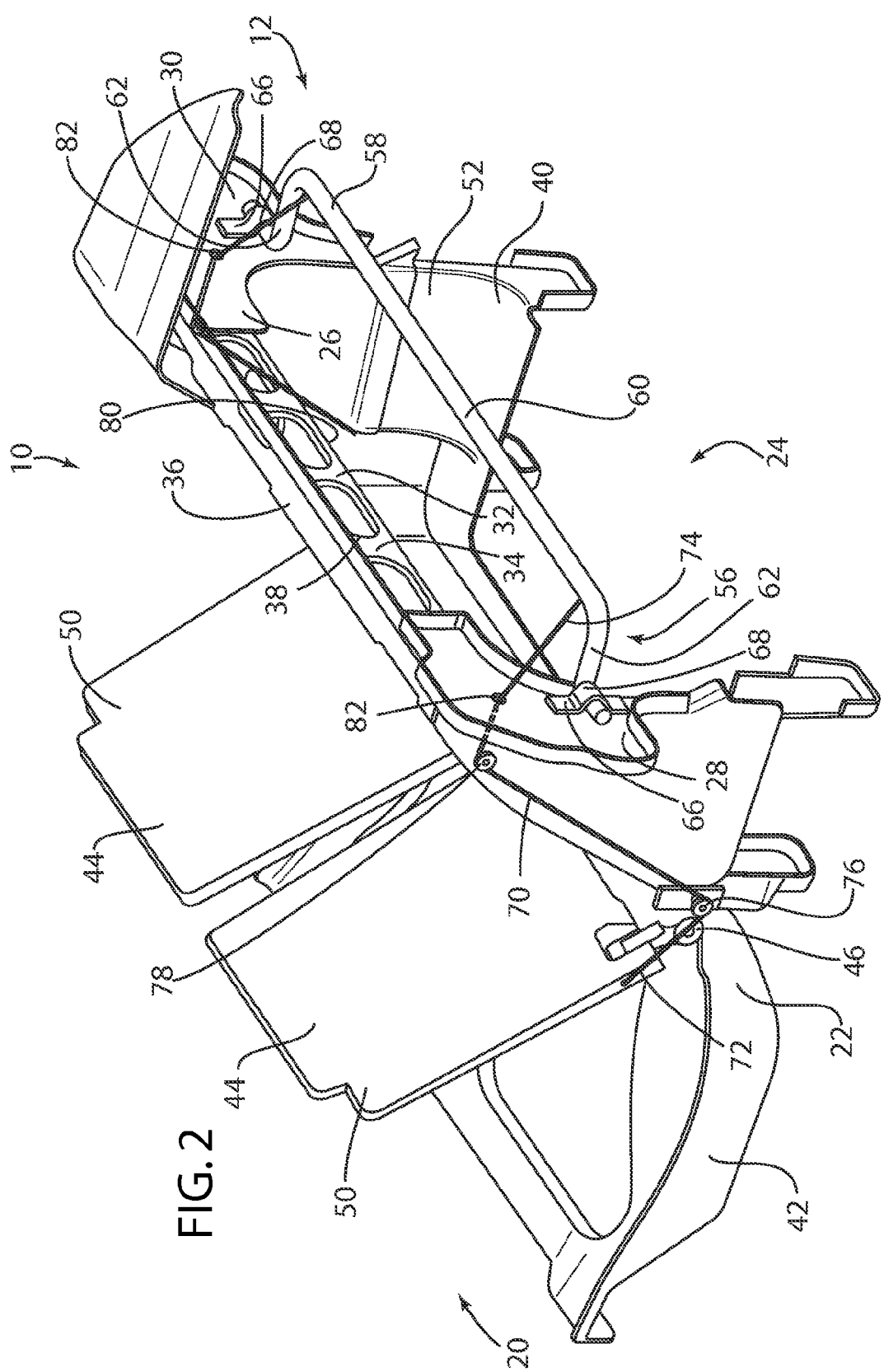
FIG. 2 is a perspective rear view of a motor vehicle incorporating the luggage retention system in accordance with the present disclosure with the rear seat backs in the partially folded position and the U-shaped bar in the partially raised position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A luggage retention system 12 is disclosed for a motor vehicle 10 comprising an occupant compartment 20 having a front seat (not shown) and a rear seat 22, as is well-known in the art. A trunk 24 is located rearward of the rear seat 22, and is separated in part from the occupant compartment 20 by a bulkhead 26 that forms a structural member of the motor vehicle 10. As is known, the trunk 24 may be accessed via trunk lid or deck 27. The bulkhead 26 is provided with a pair of mounting plates 28, 30, preferably separated by a frame 32 having a vertical section 34 and a horizontal section 36. Each of sections 34, 36 have a plurality of openings 38 that reduce the overall mass of the bulkhead 26. The bulkhead 26 also preferably includes a passageway 40 situated between mounting plates 28, 30 and below the frame 32, as best shown in FIG. 1.

Each rear seat 22, as is typical in the art, is formed from a stationary lower seat 42 and a rear seat back 44. As shown in the Figures, the luggage retention system 12 of the present disclosure preferably includes a pair of side-by-side foldable rear seat backs 44. However, it should be noted that a single seat back 44 spanning the entire width of the motor vehicle 10 can advantageously employ the present disclosure. The rear seat backs 44 have an upright position (best shown in FIG. 3) and a folded position (best shown in FIG. 1). The rear seat backs 44 are each foldable about a pivot 46 situated on each side of the seat backs 44, such that each of the foldable rear seat backs 44 form a standard rear seat back against which the vehicle occupants may rest when in the upright position. However, the foldable rear seat backs 44 form a substantially continuous surface with the floor 48 of the trunk 24 when in the folded position. To improve the aesthetics of this configuration, preferably both the rear surfaces 50 of the rear seat backs 44 and the floor 48 of the trunk 24 are carpeted in matching and substantially continuous carpeting, so that the foldable rear seat backs 44 create a continuous surface with the floor 48 of the trunk 24 when in the folded position. When in the folded position, the foldable rear seat backs 44 also create an opening 52 between the occupant compartment 20 and the trunk 24 through passageway 40 and an extended luggage area 54 that allows for pass-through accessibility from the trunk 24 over the foldable rear seat backs 44 and into the occupant compartment 20. When in the upright positions, however, the foldable rear seat backs 44 separate the occupant compartment 20 from the trunk 24.

Figure 3:
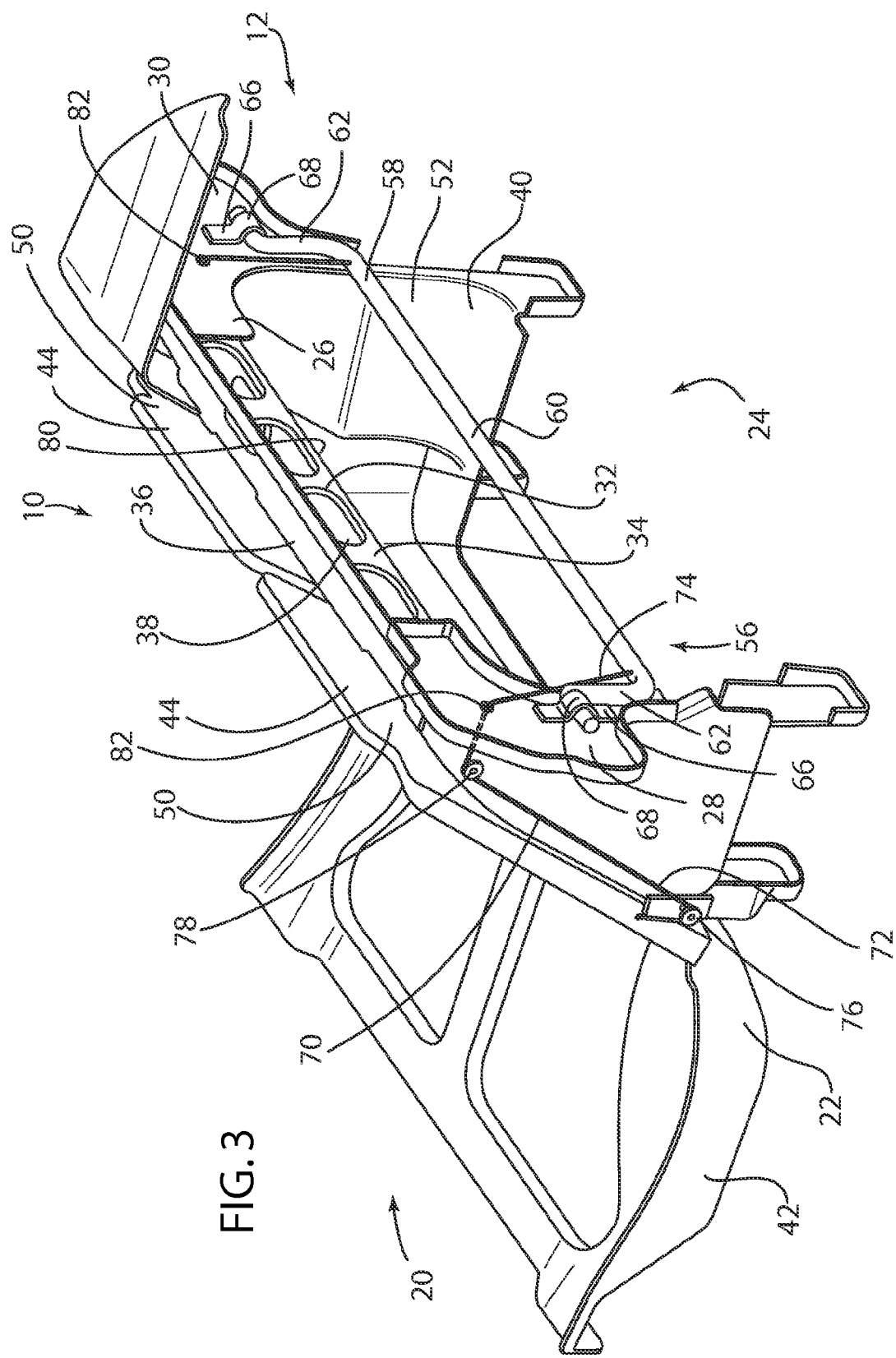
FIG. 3 is a perspective rear view of a motor vehicle incorporating the luggage retention system in accordance with the present disclosure with the rear seat backs in the upright position and the U-shaped bar in the lowered position.
Figure 3A:
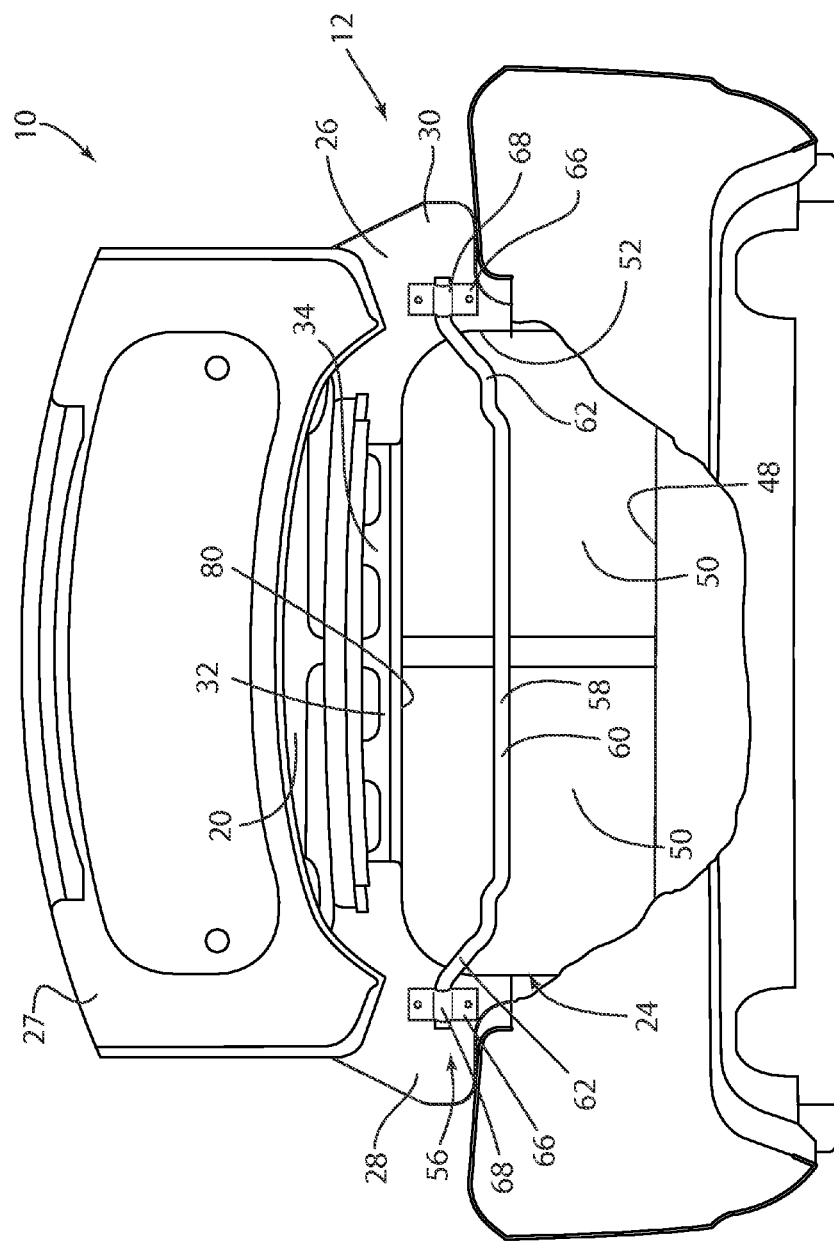
FIG. 3A is a rear plan view of a motor vehicle incorporating the luggage retention system in accordance with the present disclosure with the rear seat backs in the raised position and the U-shaped bar in the lowered position.
Figure 4:
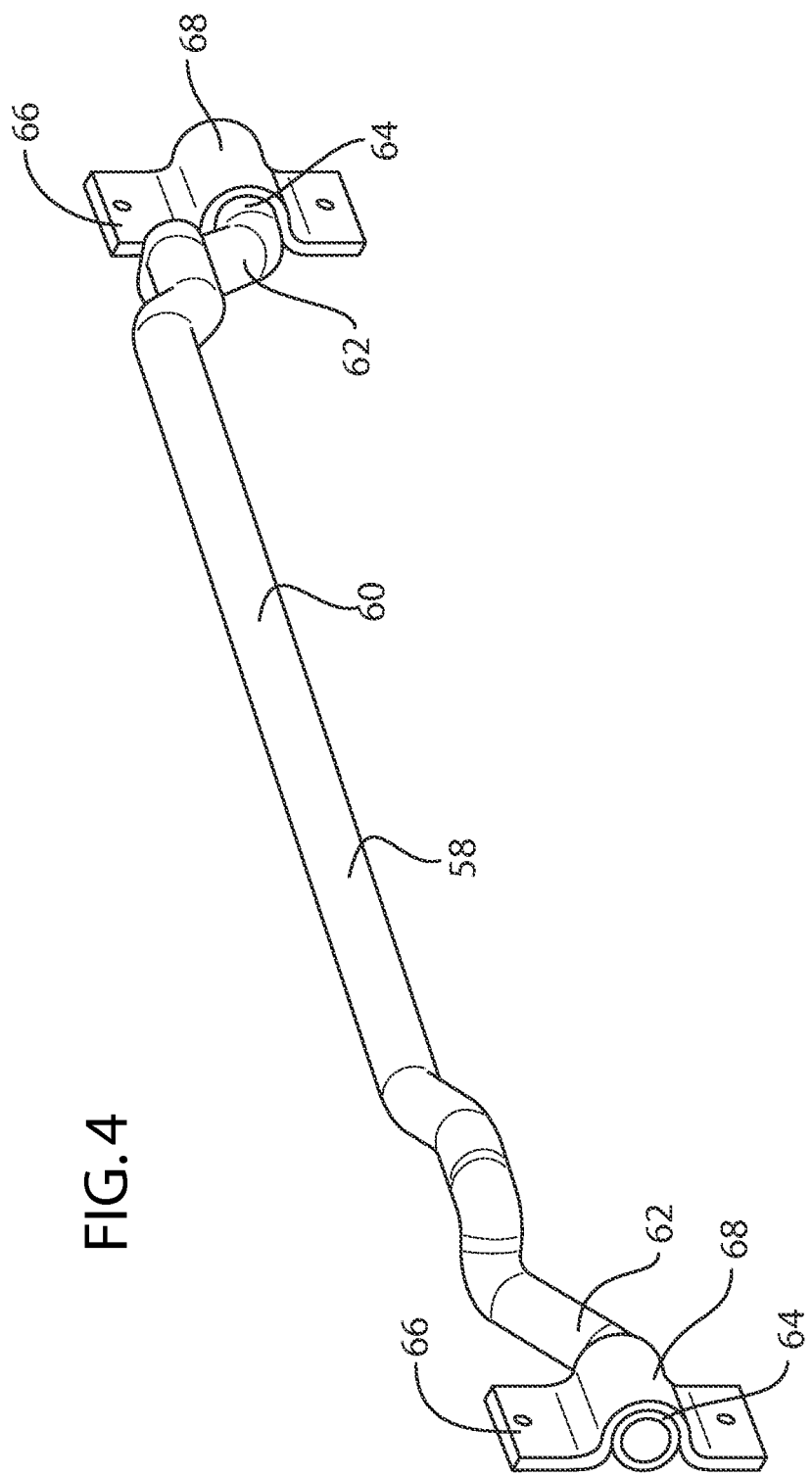
FIG. 4 is a perspective view of the U-shaped bar of the luggage retention system in accordance with the present disclosure.

A pivotable bar assembly 56 is mounted in the trunk 24. The pivotable bar assembly 56 includes a U-shaped bar 58 having a linear central portion 60 and a pair of identical matching ends 62 forming opposed mounting lugs 64, as shown in FIG. 4. The linear central portion preferably has a circular cross-sectional configuration. The U-shaped bar 58 is preferably fabricated from a hollow, tubular aluminum extrusion, as shown in FIGS. 5-10. Each of the mounting lugs 64 has an axis that is offset from the axis of the linear central portion 60 to form a substantially U shape. While the precise shape of the U-shaped bar 58 may vary depending on the vehicle layout and geometry, the U-shaped bar 58 must be capable of being raised out of and lowered into the opening 52 between the occupant compartment 20 and trunk 24, as discussed below, by rotation of the U-shaped bar 58. A pair of mounting brackets 66 having mounting fastener holes 67 pivotally secures each of the mounting lugs 64 to the pair of mounting plates 28, 30 located in the trunk on opposite sides of the opening 52 between the occupant compartment 20 and the trunk 24 via fasteners 69, as shown in FIGS. 5A and 5B. Each of the brackets 66 has a boss 68 that receives one of the lugs 64 so that the U-shaped bar 58 may be pivoted between the lowered position and a raised position, as shown in FIGS. 1-3A.

A pair of cables 70 each having a first end 72 are preferably attached to opposite ends of the linear central portion 60 of the U-shaped bar 58. A second end 74 of the cables 70 are attached to each of the foldable rear seat backs 44, preferably above and proximate the pivot 46. A first pulley 76 is, in turn, preferably mounted above and proximate the pivot 46 on the passageway 40. A second pulley 78 is preferably mounted near the passageway 40 proximate an upper edge 80 in the opening 52 between the occupant compartment 20 and the trunk 24. A cable routing hole 82 preferably extends through each of the mounting plates 28, 30 in the trunk 24, wherein the cables 70 pass under the first pulley 76, over the second pulley 78 and through the routing hole 82.

With the U-shaped bar 58 thus operatively connected to the foldable rear seat backs 44, the U-shaped bar 58 may be thereby pivoted between its lowered position and raised position to move the foldable rear seat backs 44 between their upright and folded positions, respectively. That is, pivoting the U-shaped bar 58 to the lowered position pulls on the cable 70 to move the foldable rear seat backs 44 to the upright position, as shown in FIGS. 3 and 3A. This advantageously results in positioning of the U-shaped bar 58 across the opening 52, which also creates a structural safety barrier against objects in the trunk 24 impacting the rear surface 50 of the rear seat backs 44. Pivoting the U-shaped bar 58 to the raised position allows the rear seat backs 44 to move to the folded position, under the force of gravity, to provide uninterrupted access to the occupant compartment 20 from the trunk 24, as shown in FIGS. 1 and 1A.

The luggage retention system 12 also includes a latch assembly 84 for latching the U-shaped bar 58 in at least the lowered position. With the U-shaped bar so latched, the foldable rear seat backs 44 are also effectively latched and restrained in the upright position by the tension in the cable 70 acting on the rear seat back 44. The latch assembly 84 preferably comprises a first portion 86 provided on at least one, and preferably each, of the mounting lugs 64 and a second portion 88 similarly provided on at least one, and preferably each, of the brackets 66 retaining the mounting lug 64. The first portion 86 may engage the second portion 88 in number of ways, as described below.

Figure 5:
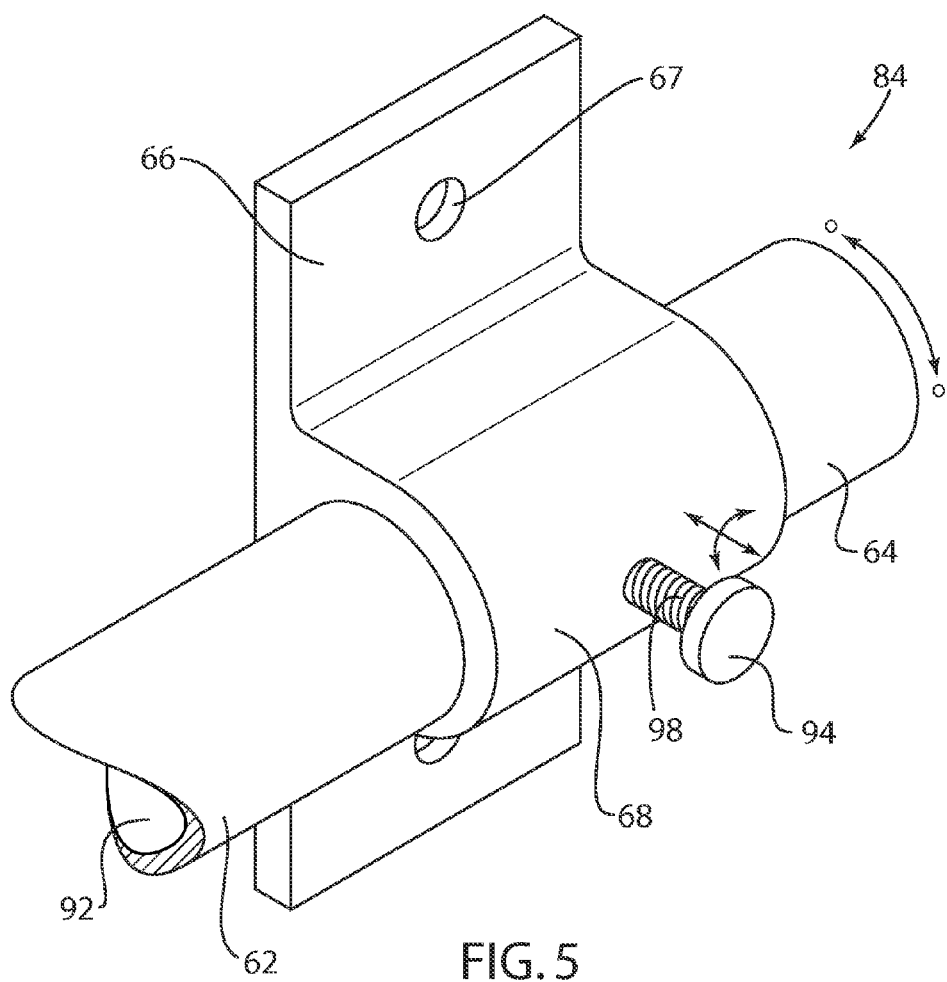
FIG. 5 is a perspective view of a first embodiment of the latch assembly of the luggage retention system in accordance with the present disclosure.
Figure 5B:
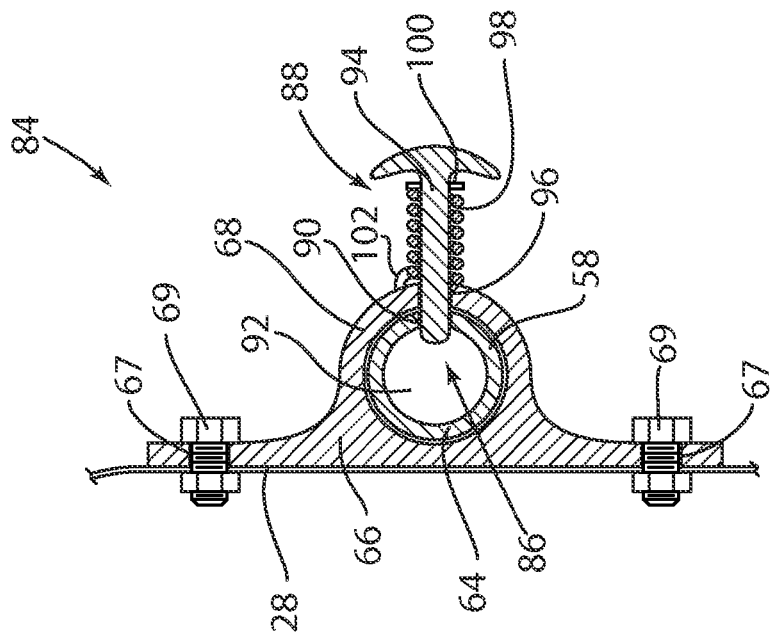
FIGS. 5A and 5B are cross-sectional views of the first embodiment of the latch assembly of the luggage retention system in accordance with the present disclosure.
Figure 5A:
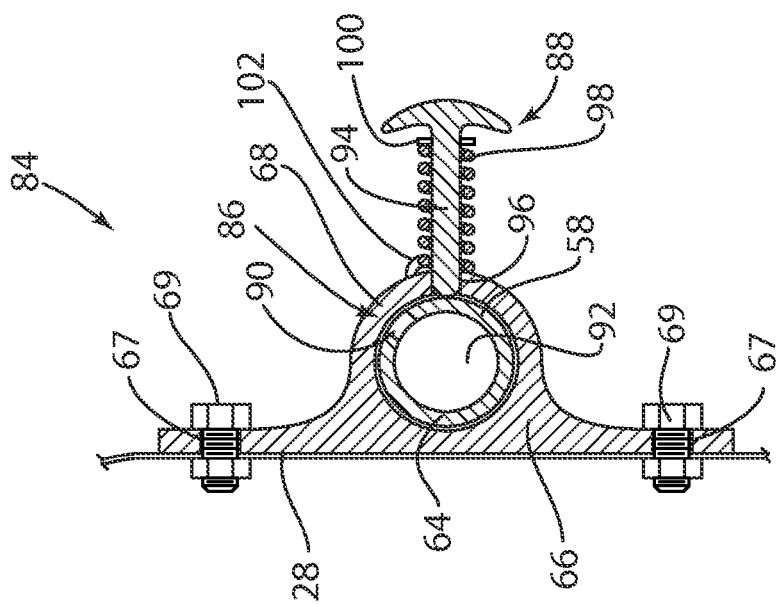

A first embodiment of the latch assembly 84 is shown in FIGS. 5, 5A and 5B. Therein, the first portion 86 of the latch assembly 84 is a radial hole 90 extending through the mounting lug 64 into the hollow portion 92 of the U-shaped bar 58. The second portion 88 of the latch assembly 84 is a pen 94 urged to extend through a hole 96 in the boss 68 of the bracket 66. The pen 94 is provided with a spring 98 that is attached at one end to a collar 100 on the pen 94 and at another end to a tab 102 on the bracket 66 so as to urge the pen 94 toward the bracket 66. As the U-shaped bar 58 is rotated to the lowered position, the hole 90 in the U-shaped bar 58 and the hole 96 in the boss 68 of the bracket 66 are brought into alignment, whereupon the spring-loaded pen 94 is urged into engagement with both the hole 90 in the mounting lug 64, as well as the hole 96 in the boss 68 of the bracket 66, to latch the U-shaped bar 58 and secure it in the lowered position. The U-shaped bar 58 may be readily released and allowed to again pivot within the brackets 66 when the spring-loaded pen 94 is manually withdrawn from engagement with the whole 90 in the mounting lug 64 against the urging of the spring 98.

Figure 6:
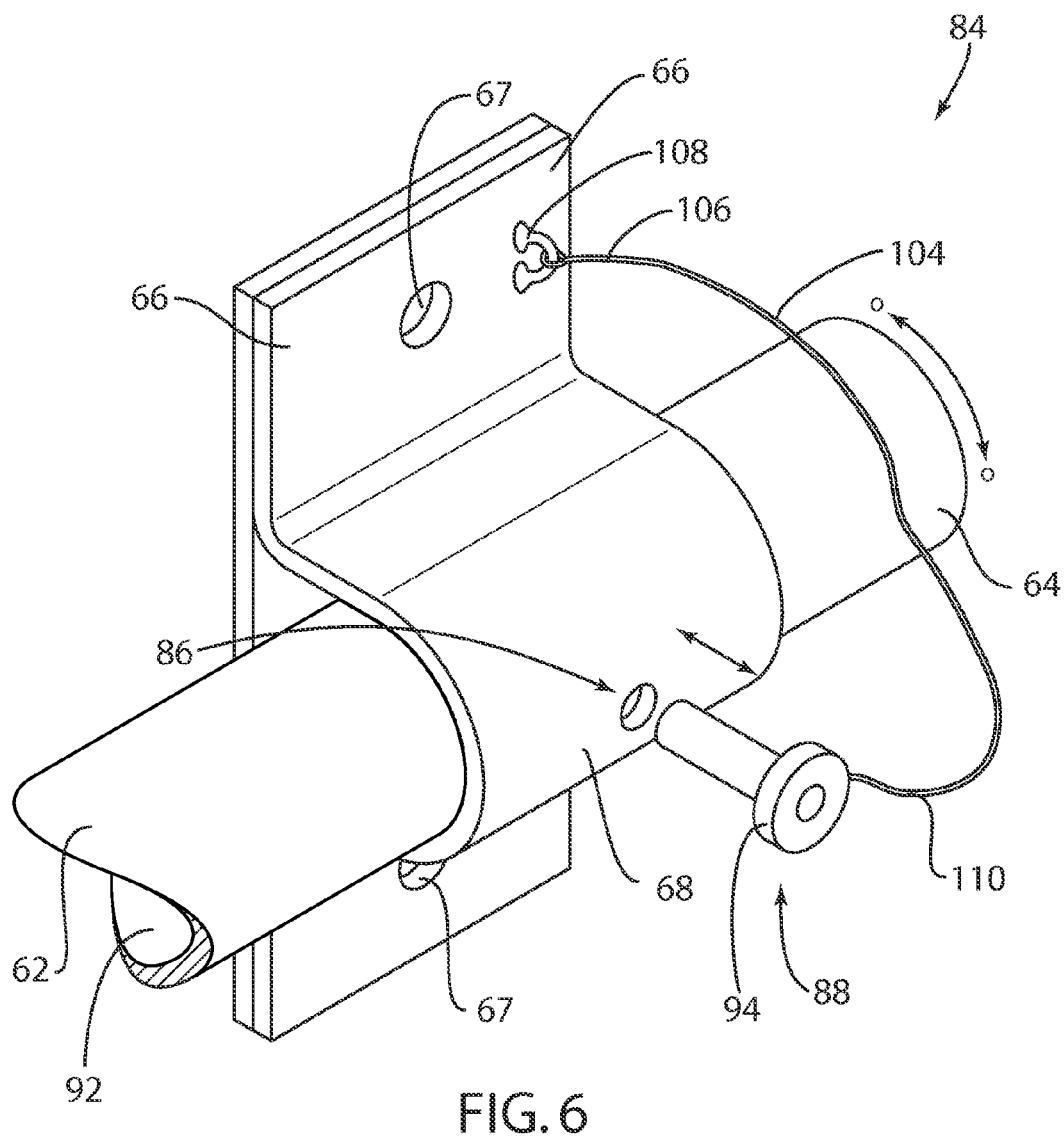
FIG. 6 is a perspective view of a second embodiment of the latch assembly of the luggage retention system in accordance with the present disclosure.

A second embodiment of the latch assembly 84 is shown in FIG. 6. As in the first embodiment, the first portion 86 of the latch assembly 84 is a radial hole 90 extending through the mounting lug 64 into the hollow portion 92 of the U-shaped bar 58. The second portion 88 of the latch assembly 84 is likewise a pen 94 that extends through hole 96 in the boss 68 of the bracket 66. However, the pen 94 is not provided with a spring 98, but is rather manually inserted through holes 96 and 90, respectively, when the U-shaped bar 58 is rotated to the lowered position and the hole 90 and the hole 96 are brought into alignment. The pen 94 may then be inserted into engagement with the hole 96 and hole 90 to secure the U-shaped bar in the lowered position. Preferably, the pen 94 is fabricated from a plastic material and is sized to snuggly fit into the hole 96. As in the first embodiment, the U-shaped bar 58 may be readily released and allowed to pivot within the brackets 66 when the pen 94 is manually withdrawn from engagement with the hole 90 in the mounting lug 64. Preferably, the latch assembly 84 also includes a cable 104 attached at a first end 106 to a cable retainer 108 mounted to either of the bracket 66 or one of the trunk mounting plates 28, 30 and attached at a second end 110 to the removable pen 94. Cable 104 is useful to prevent the pen 94 from being lost or misplaced.

Figure 7:
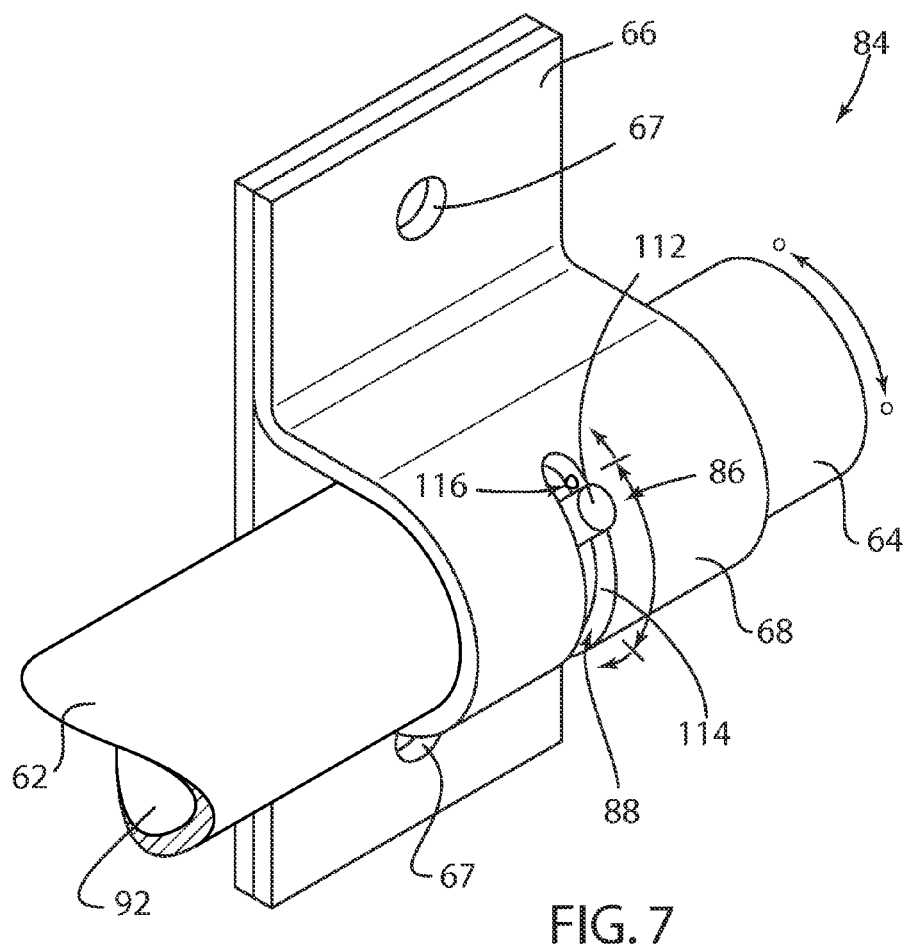
FIG. 7 is a bottom perspective view of a third embodiment of the latch assembly of the luggage retention system in accordance with the present disclosure.

A third embodiment of the latch assembly 84 is shown in FIG. 7, shown in the bottom view. The first portion 86 of the latch assembly 84 is a tab 112 extending radially from the mounting lug 64 and the second portion 88 of the latch assembly 84 is a straight radial slot 114 provided essentially along the length of the boss 68 into and through which the tab 112 extends. The radial slot 114 preferably has a detent 116 on at least the lower end of the slot 114 which resiliently receives and retains the tab 112 to prevent the U-shaped bar 58 from unintentionally pivoting and retains the U-shaped bar 58 in its lowered position.

Figure 8:
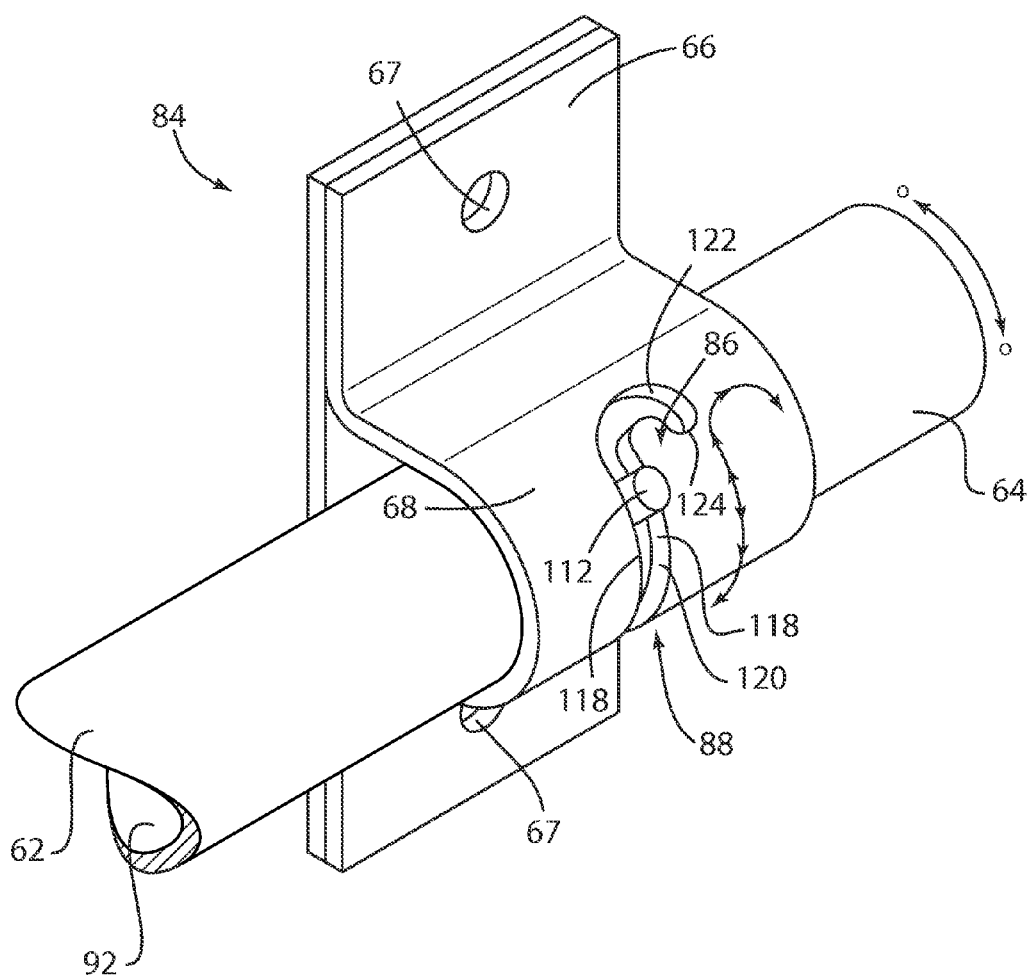
FIG. 8 is a bottom perspective view of a fourth embodiment of the latch assembly of the luggage retention system in accordance with the present disclosure.

A fourth embodiment of the latch assembly 84 is shown in FIG. 8, also shown in the bottom view. The first portion 86 of the latch assembly 84 also comprises a tab 112 extending radially from the mounting lug 64. However, the second portion 88 of the latch assembly 84 is a J-shaped slot 118 provided essentially along the length of the boss 68 into and through which the tab 112 extends. The J-shaped slot 118 has a straight section 120 that allows the U-shaped bar to pivot within the bracket 66 and a curved end section 122. When the U-shaped bar is pivoted to the lowered position, the tab 112 moves within the straight section 120 and into curved section 122 to rest against the stop 124, thus preventing the U-shaped bar from pivoting unless released and retaining the U-shaped bar 58 in its lowered position.

Figure 9:
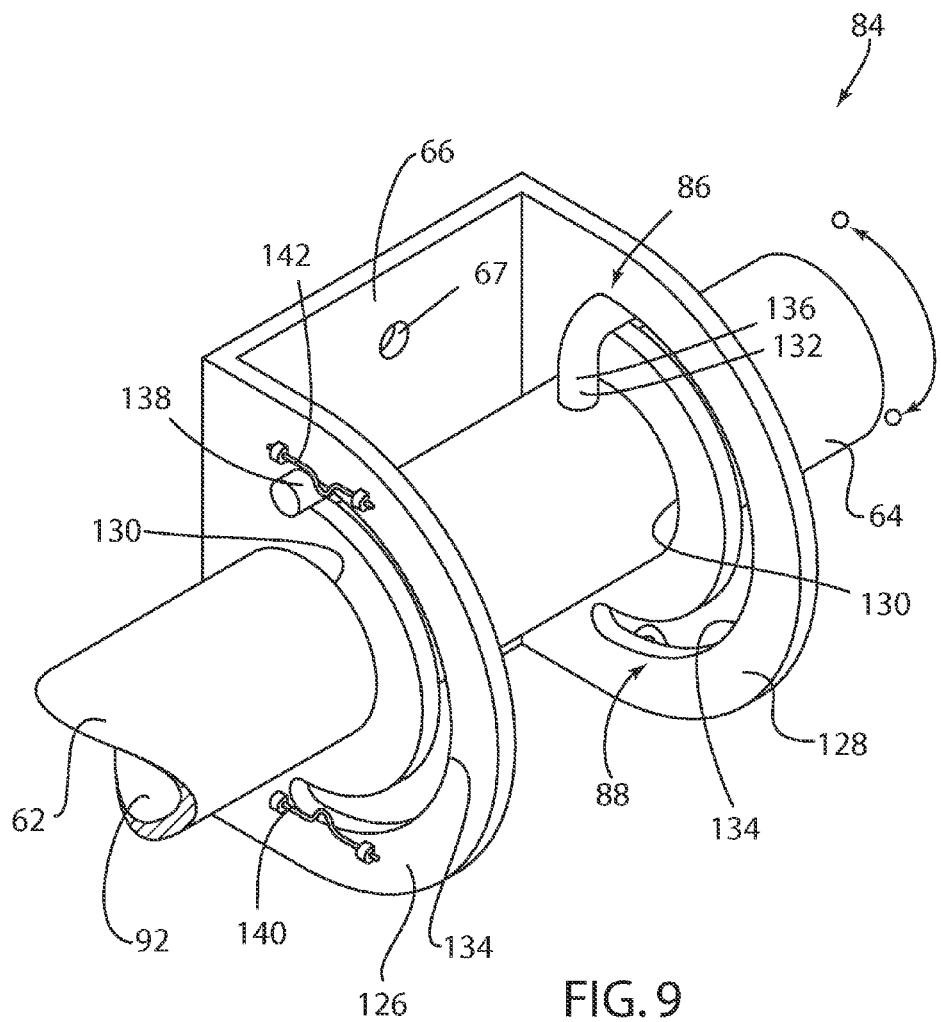
FIG. 9 is a perspective view of a fifth embodiment of the latch assembly of the luggage retention system in accordance with the present disclosure.

A fifth embodiment of the latch assembly 84 is shown in FIG. 9. Here, the mounting bracket 66 includes a pair of parallel flat plates 126, 128 extending perpendicularly relative to the mounting lug 64. Each of the flat plates 126, 128 has a mounting opening 130 within which the mounting lug 64 is fittingly received. The first portion 86 of the latch assembly 84 is a bent tab 132 mounted onto the mounting lug 64. The second portion 88 of the latch assembly 84 is a semi-circular slot 134 within the flat plate concentric with the mounting opening 130. The bent tab 132 has a first leg 136 extending radially from the mounting lug 64 and a second leg 138 extending parallel to the mounting lug and extending into the semi-circular slot 134. The latching assembly 84 thus allows rotational motion of the U-shaped bar 58 between the lowered position and the raised position.

To latch the U-shaped bar 58 in the lowered position, a lower spring clip 140 is mounted to and near the bottom of the flat plate 126 and tangential to the semi-circular slot 134. The spring clip 140 has an extending notch 142 that resiliently engages the second leg 138 of the bent tab 132 on the mounting lug 64 for latching the U-shaped bar 58 in the lowered position. A second upper spring clip 142 is preferably added to allow the U-shaped bar 58 to be also latched in the raised position, as shown in FIG. 9.

Figure 10:
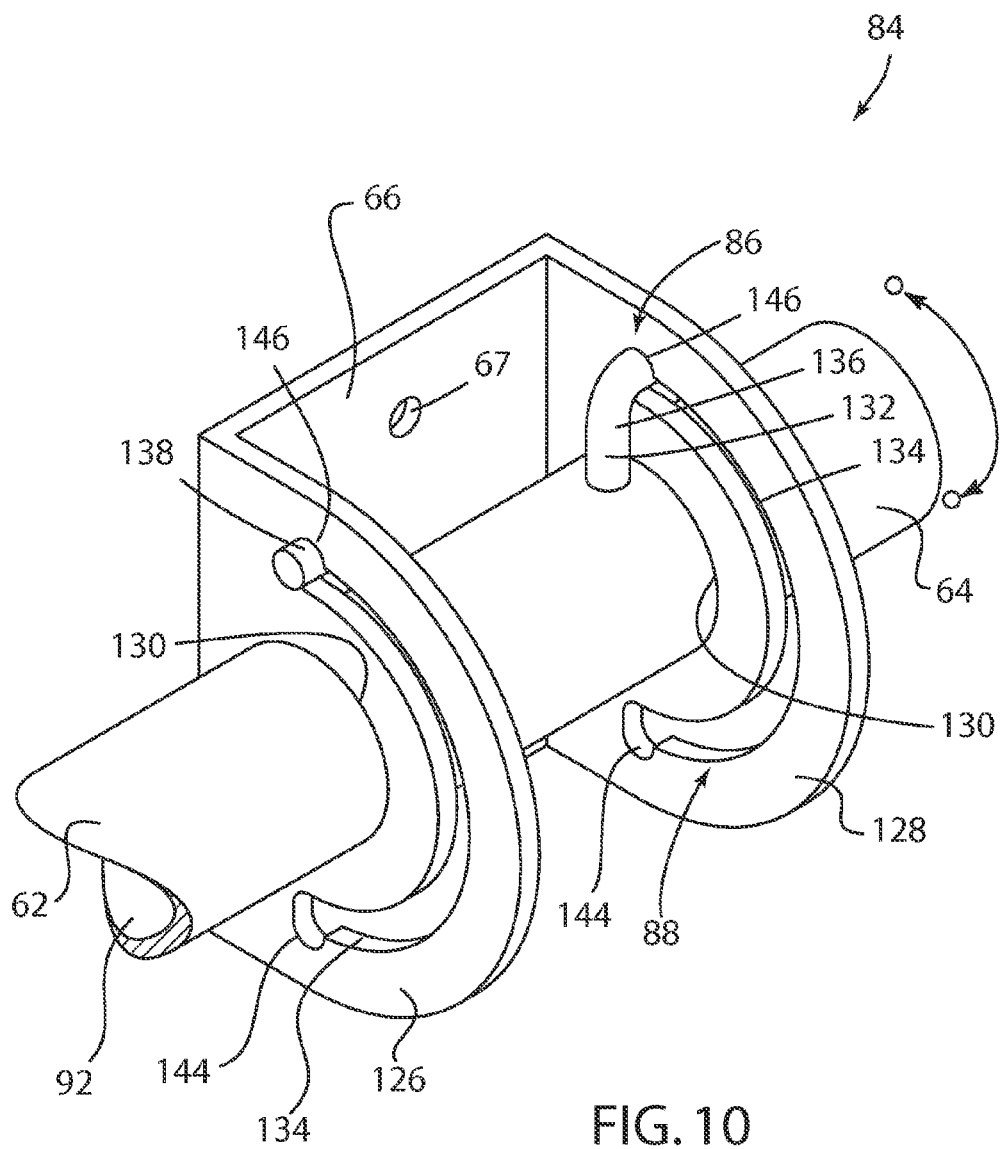
FIG. 10 is a perspective view of a sixth embodiment of the latch assembly of the luggage retention system in accordance with the present disclosure.

A sixth embodiment of the latch assembly 84 is shown in FIG. 10, and shares many of the features of the fifth embodiment described above. Here, the semi-circular slot 134 is provided with a resilient detent 144 formed at a lower end of the semi-circular slot 134 in the flat plate 126, where the detent 144 resiliently and releasably engages the second leg 138 of the bent tab 132 on the mounting lug 64 for latching the U-shaped bar 58 in the lowered position. A second detent 146 is preferably provided at the upper end of the semi-circular slot 134 to allow the U-shaped bar 58 to be also latched in the raised position, as shown in FIG. 10.

In the embodiments for the latch assembly 84 disclosed herein, it should be noted that a latching assembly 84 may be provided on each of the pair of mounting lugs 64 and on each of the brackets 66 on opposite sides of the motor vehicle 10 in order to increase the strength and reliability of the latch effort and to balance the load on either side. Further, as previously described in relation to the embodiments shown in FIGS. 9 and 10, each of the embodiments of the latch assembly 84 of the luggage retention system 12 can be adapted to latch the U-shaped bar 58 in both the lowered position and the raised position. For example, in the embodiments shown in FIGS. 5 and 6, an additional hole can be added and located approximately 180° about the diameter of the mounting lug 64 relative to the hole 90, such that holes in the mounting lug 64 and bracket boss 68 are aligned in each of the raised and lower positions of the U-shaped bar 58, whereby pen 94 can be inserted to latch the U-shaped bar 58 in either position. In the embodiments shown in the FIGS. 7 and 8, a detent 116 or curved section 122 can be provided at each end of the slot 114, respectively.

As disclosed herein, a solution to shift the load responsibility for articles moving about in a trunk from the seat backs to a separate strong and rigid structure such as U-shaped bar 58 can eliminate the need for heavy and costly seat back structures. However, while the luggage retention system 12 disclosed herein does present such a solution, it also tends to reduce usable space in the trunk 24, potentially hindering the usefulness of the trunk 24. As a way to return this trunk 24 space and provide additional features as well, the present disclosure includes a parcel storage system 200 that may be combined with the pivotable bar assembly 56 to provide extra storage and security for certain items, particularly for tablets and laptops, and to provide a method of locking the same securely in place. Also, the present disclosure includes a collapsible storage bin 300 combined with the pivotable bar assembly 56 for keeping items from rolling around freely in the trunk 24 in the first place, as discussed below.

The parcel storage system 200 is particularly adapted for storing relatively flat items, such a tablet computer, and allowing the tablet computer to communicate with the vehicle's onboard computer, is shown in FIGS. 11-16. The parcel storage system 200 primarily includes a parcel shelf 202 mounted to the pivotable bar assembly 56 and movable between an accessible position when the pivotable bar assembly 56 is in the lowered position and a stowed position when the pivotable bar assembly 56 is the raised position.

Preferably, the parcel shelf 202 is of a two piece design made of lightweight plastic and hinged together to form a four-bar mechanism in combination with the pivotable bar assembly 56. The parcel shelf 202 preferably has a substantially planar section 204 and a hinge section 206 interconnected one to the other via a hinge 208. In order to facilitate the efficient stowage of the parcel shelf 202, as discussed further below, the planar section 204 of the parcel shelf 202 is preferably several times (even more preferably about three times) the longitudinal height of the hinge section 206 interconnected to the planar section 204, as shown in FIGS. 11-16.

Figure 15:
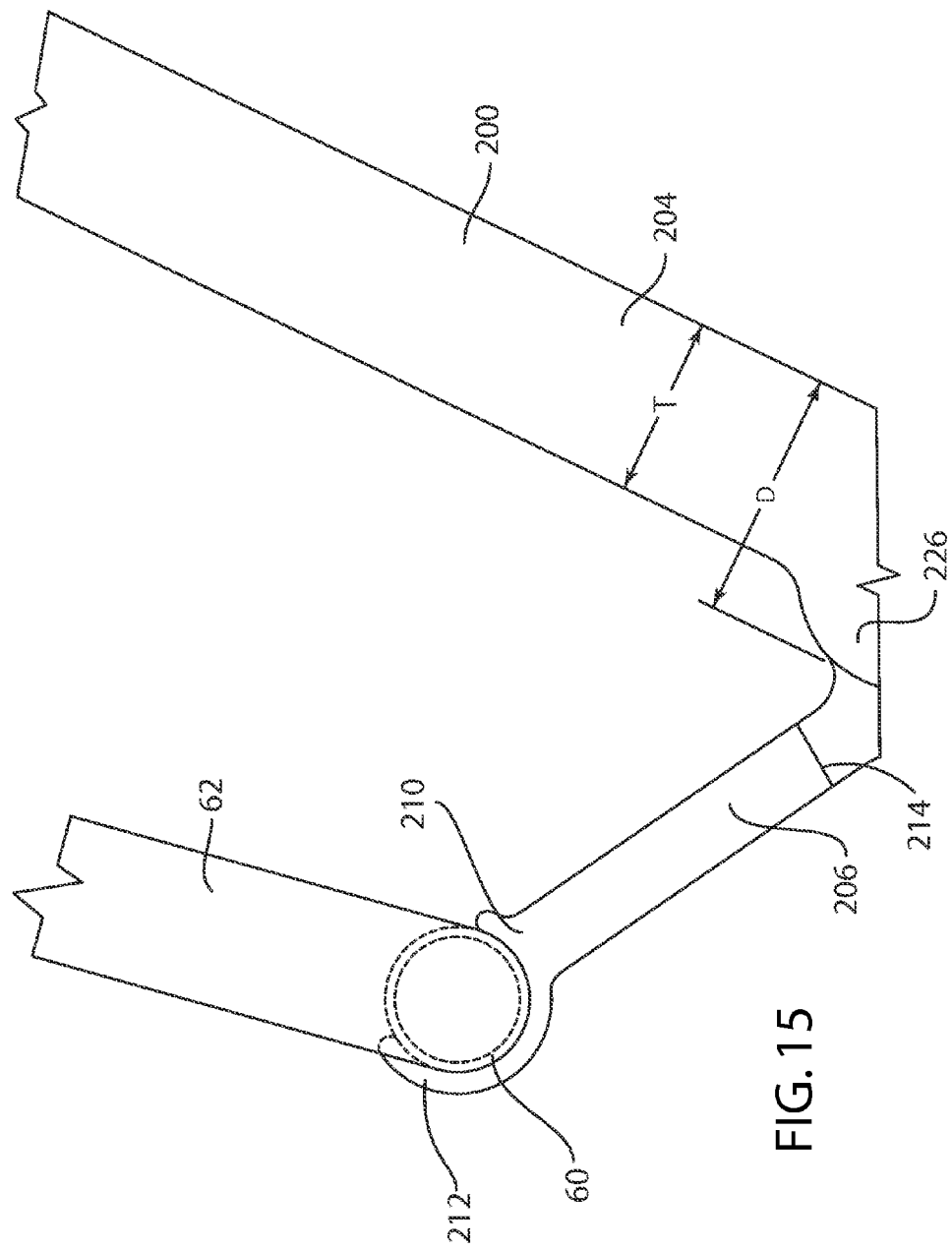
FIG. 15 is a partial side plan view of the luggage retention system and the parcel storage system in accordance with the present disclosure with the U-shaped bar in the lowered position.
Figure 16:
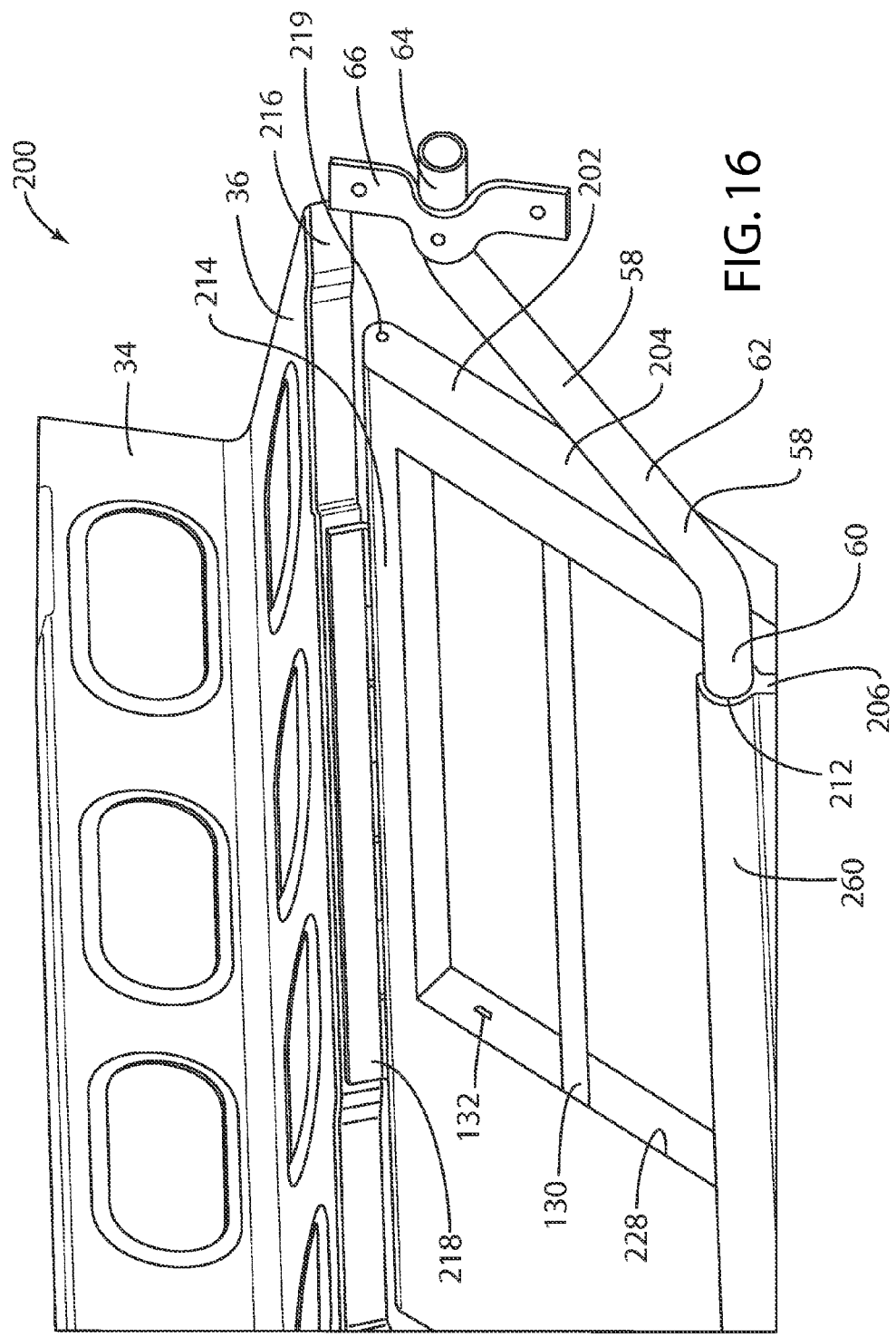
FIG. 16 is a perspective rear view of a motor vehicle incorporating the luggage retention system and the parcel storage system in accordance with the present disclosure with the U-shaped bar in the lowered position and the parcel storage shelf in the lowered position.

The hinge section 206 includes a rearward edge 210 pivotably attached to the linear central portion 60 of the U-shaped bar 58, which preferably has a circular cross-section as shown in FIG. 15. The rearward edge 210 of the parcel shelf 202 is preferably attached to the linear central portion 60 of the U-shaped bar 58 with a resilient C-clip 212 that preferably pivotably and releasably engages the linear central portion 60 of the U-shaped bar 58, as shown in FIGS. 11-16, and as best seen in FIG. 15. The parcel shelf 202 further comprises a forward edge 214 on the planar section 204 pivotably attached to a forward portion 216 of the horizontal cross member 36 by a mounting plate 218. That is, the forward edge 214 of the parcel shelf is pivotably attached to the horizontal cross member 36 by a mounting plate 218. The mounting plate 218 is preferably rotatably coupled to the forward edge 214 by piano hinge 219 defined by slots 220 on the planar section 204 of the parcel shelf 202 that cooperate with and receive a plurality of knuckles 222 on the mounting plate 218. The hinge 208 interconnecting the planar section 204 and the hinge section 206 of the parcel shelf 202 is also preferably a piano hinge having slots 224 on the hinge section 206 of the parcel shelf 202 that cooperate with and receive a plurality of knuckles 226 on the planar section 204 of the parcel shelf 202.

Figure 11:
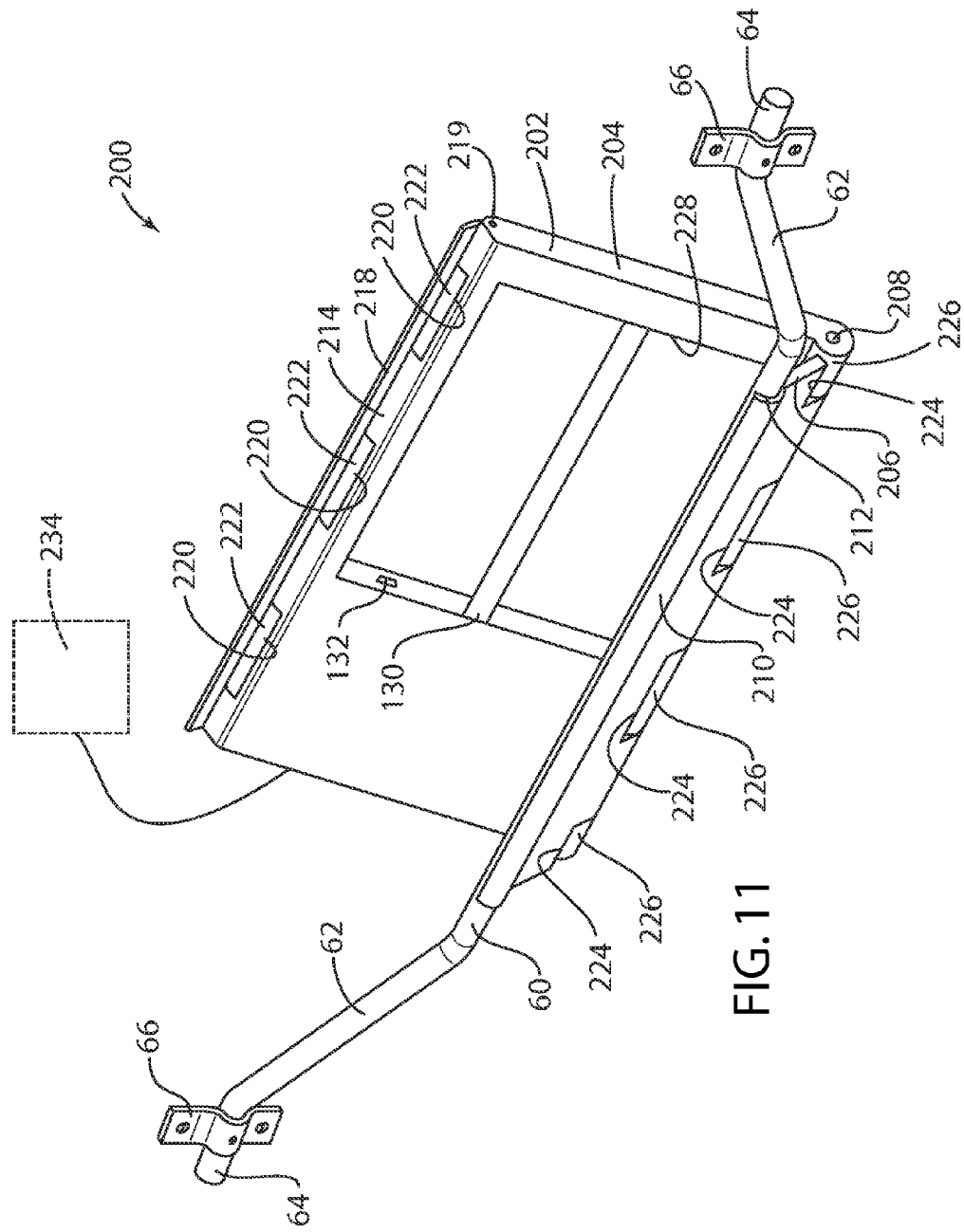
FIG. 11 is a perspective rear view of the luggage retention system and the parcel storage system in accordance with the present disclosure with the U-shaped bar in the lowered position and the parcel storage shelf in the lowered position.
Figure 12:
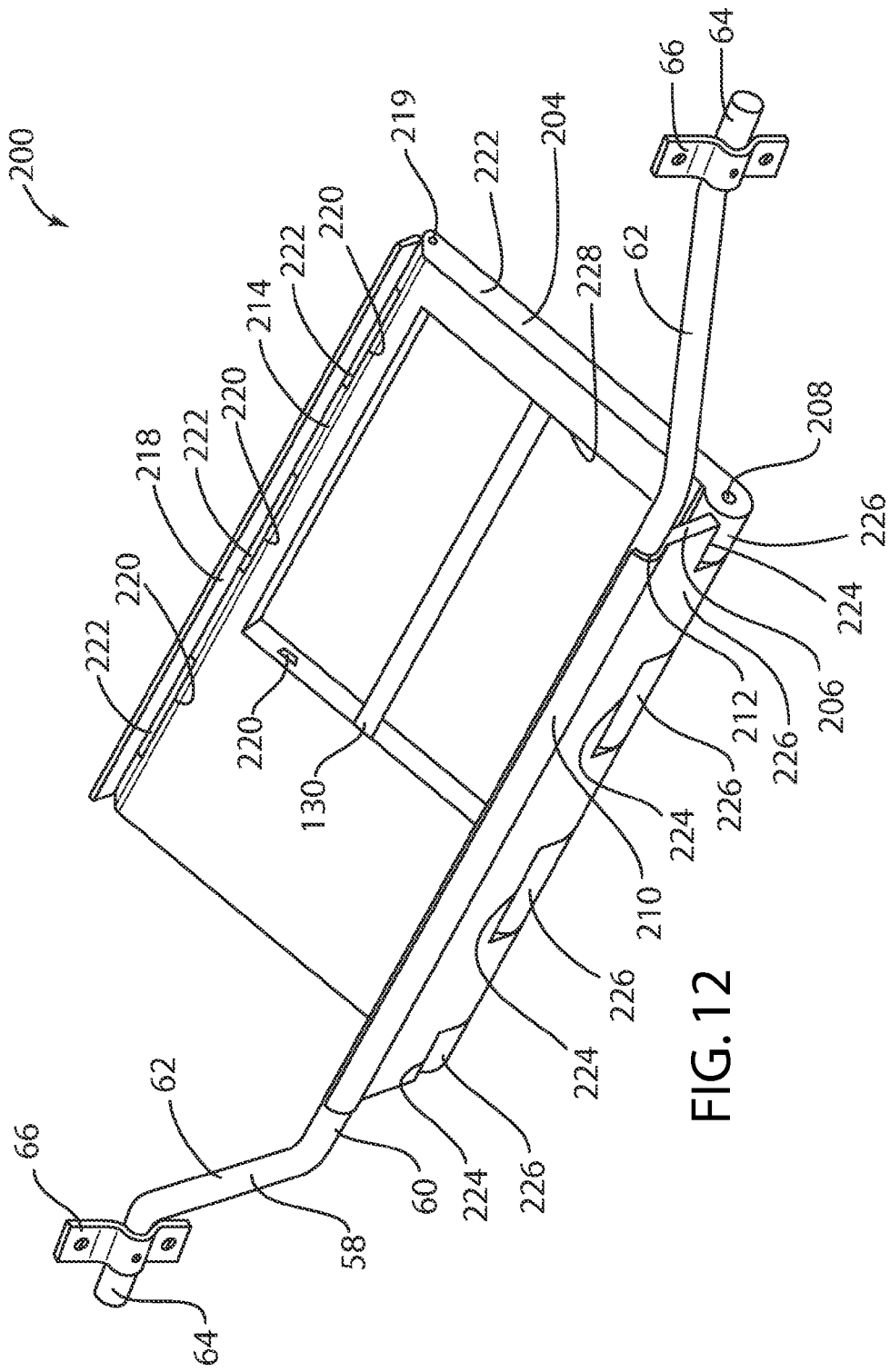
FIG. 12 is a perspective rear view of the luggage retention system and the parcel storage system in accordance with the present disclosure with the U-shaped bar in the partially raised position and the parcel storage shelf in the partially stowed position.
Figure 13:
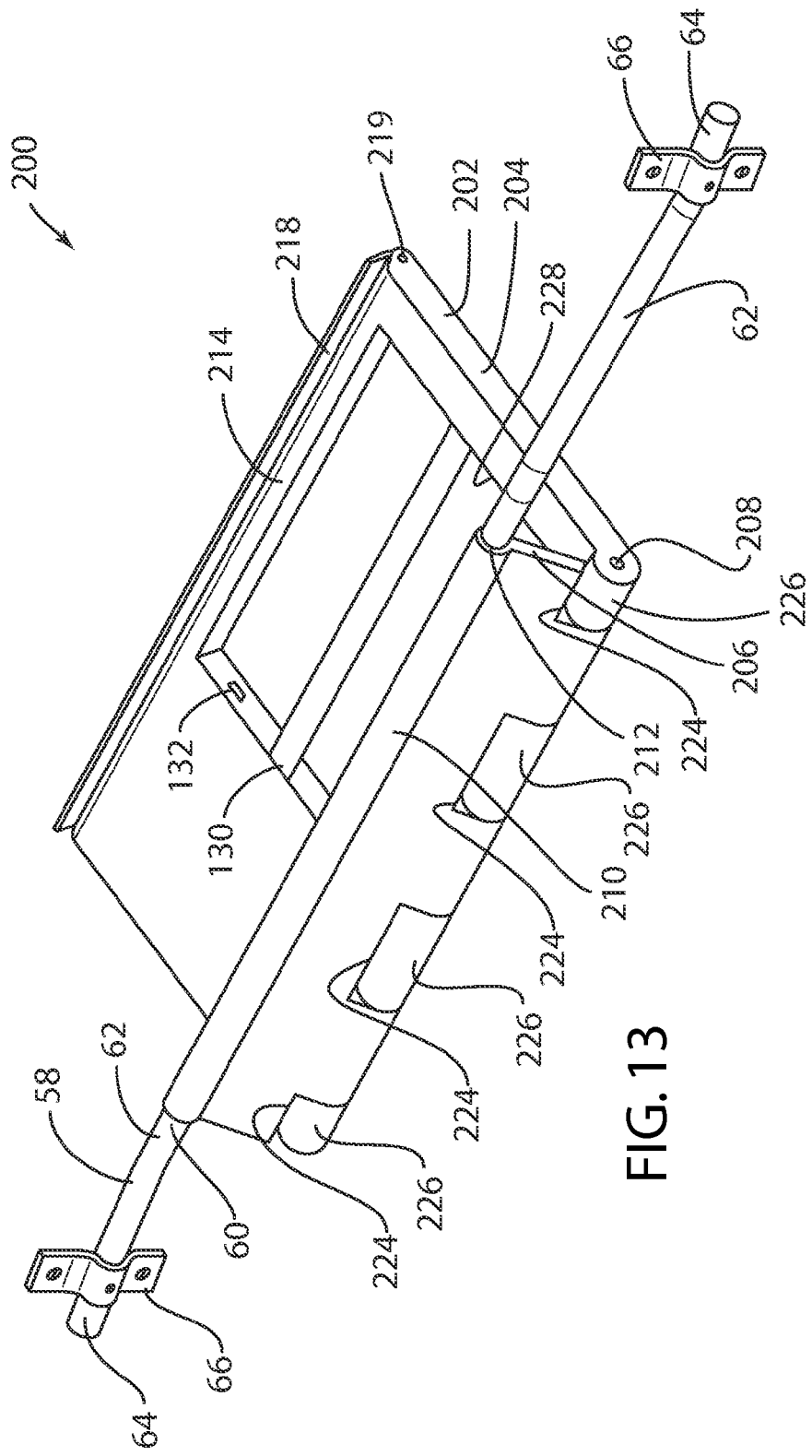
FIG. 13 is a perspective rear view of the luggage retention system and the parcel storage system in accordance with the present disclosure with the U-shaped bar in a further partially raised position and the parcel storage shelf in the further partially stowed position.
Figure 14:
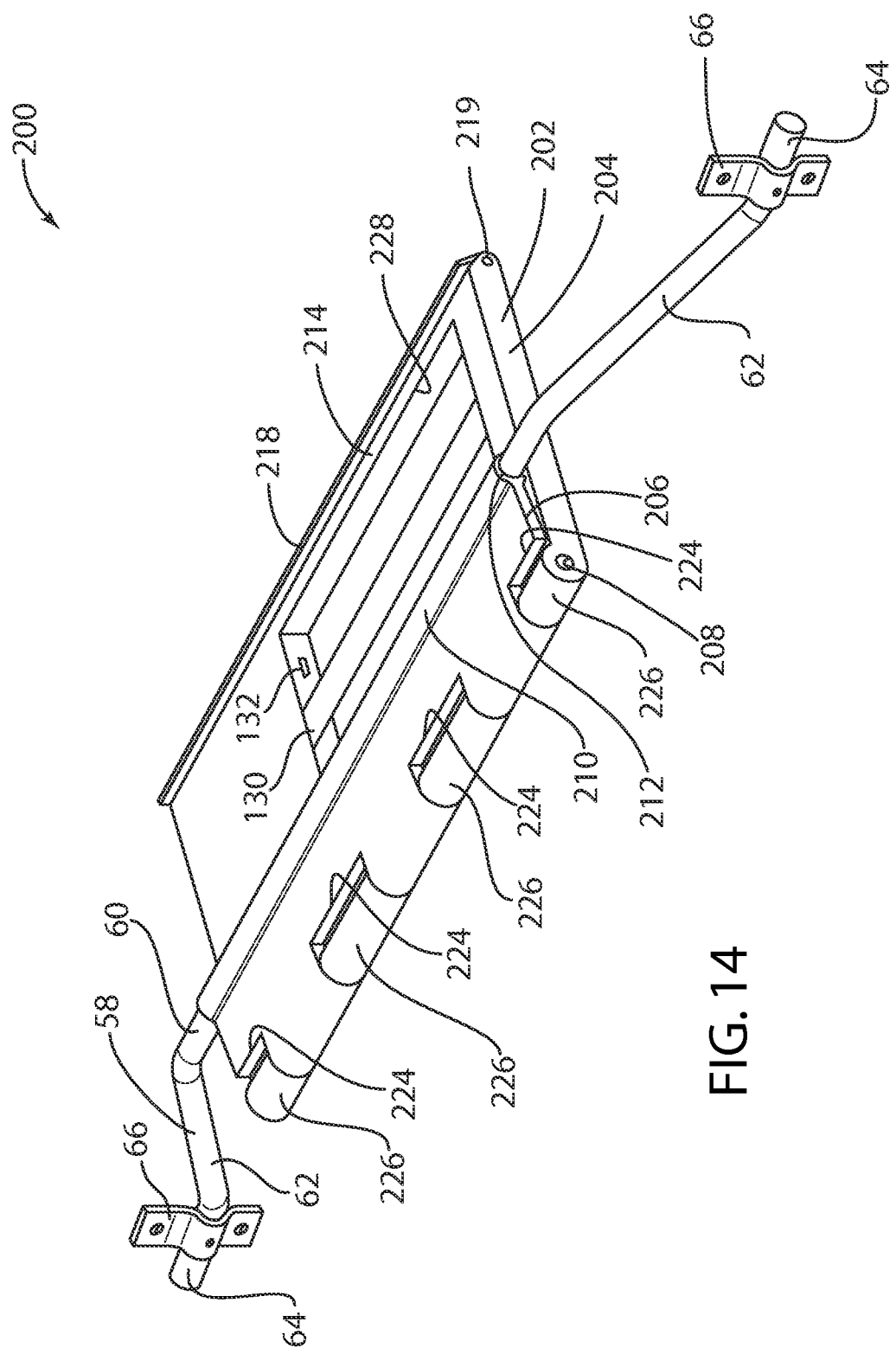
FIG. 14 is a perspective rear view of the luggage retention system and the parcel storage system in accordance with the present disclosure with the U-shaped bar in the fully raised position and the parcel storage shelf in the fully stowed position.

As shown in FIG. 11, the parcel shelf 202 is provided with a shallow recess 228 for storing substantially flat articles, which is accessible when the pivotable bar 58 is in the lowered position. The recess 228 is preferably adapted to accept and restrain a tablet computer via, for example, an elastomeric restraining strap 130. Of course, other restraining systems can be used, such as a netting to cover the recess and thereby form a pocket or hook and loop strips. Preferably, the recess 128 is further equipped with a computer data port 132, such as a USB port, for connecting the tablet computer to a computer system 134 for the motor vehicle and integrating the tablet computer into the motor vehicle computer system 134 for safe, hands-free, and voice-activated operation. This connection via data port 132 also allows for charging the battery of the tablet computer so that it is fully charged upon the vehicle users reaching their destination.

Figure 28:
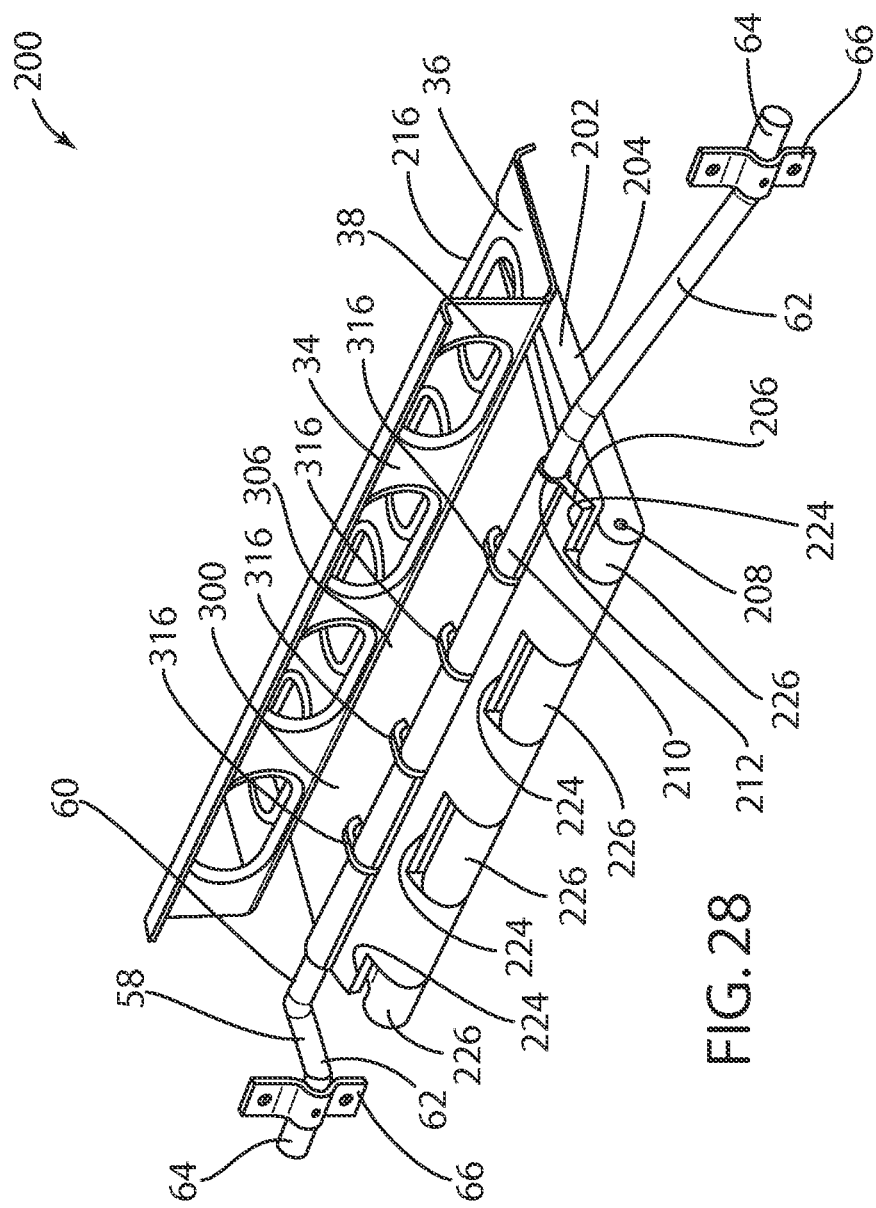
FIG. 28 is a perspective rear view of a motor vehicle incorporating the luggage retention system, the parcel storage system and collapsible storage bin in accordance with the present disclosure with the U-shaped bar in the fully raised position, the parcel storage shelf in the fully stowed position and the collapsed collapsible storage bin in the fully stowed position.

When the U-shaped bar 58 of the luggage retention system 12 of the present disclosure is in its lowered position and latched into place by latch 84 as discussed above, the parcel shelf 202 is accessible and gives extra space to the user that might have been lost otherwise. Conversely, when the U-shaped bar 58 of the luggage retention system 12 of the present disclosure is moved to its raised position and preferably latched into position using latch assembly 84, the parcel shelf 202 articulates with the U-shaped bar 58 of the luggage retention system 12 to close proximity with the trunk deck 27 and is finally positioned snugly below bulkhead cross member 36, allowing the user full access to the passageway 40. That is, the parcel shelf 202 is situated parallel with, proximate to and beneath the bulkhead cross member 36 when in the stowed position, allowing full access to the opening and the occupant compartment. Further, as shown in FIG. 15, the knuckles 226 of the hinge 208 on the planar section 204 have a larger diameter D than the thickness T of the planar section 204, such that the hinge section 206 of the parcel shelf 202 folds against and is substantially parallel to the planar section 204 of the parcel shelf 202 when in the stowed position, further enhancing full access to the opening and the occupant compartment. Moreover, when the pivotable bar 58 is moved to the raised position, articles stored in the recess 228 of the planar section 204 of the parcel shelf are physically inaccessible and secured, as best shown in FIG. 28.

The luggage retention system 12 of the present disclosure also allows the use of the eyelets and/or rings to adapt the system 12 for additional storage. In particular, users often store items in the trunk 24 that are loose and have a tendency to move around throughout the trunk 24, creating noise and potentially damaging the trunk 24 or other items in the trunk 24.

Figure 17:
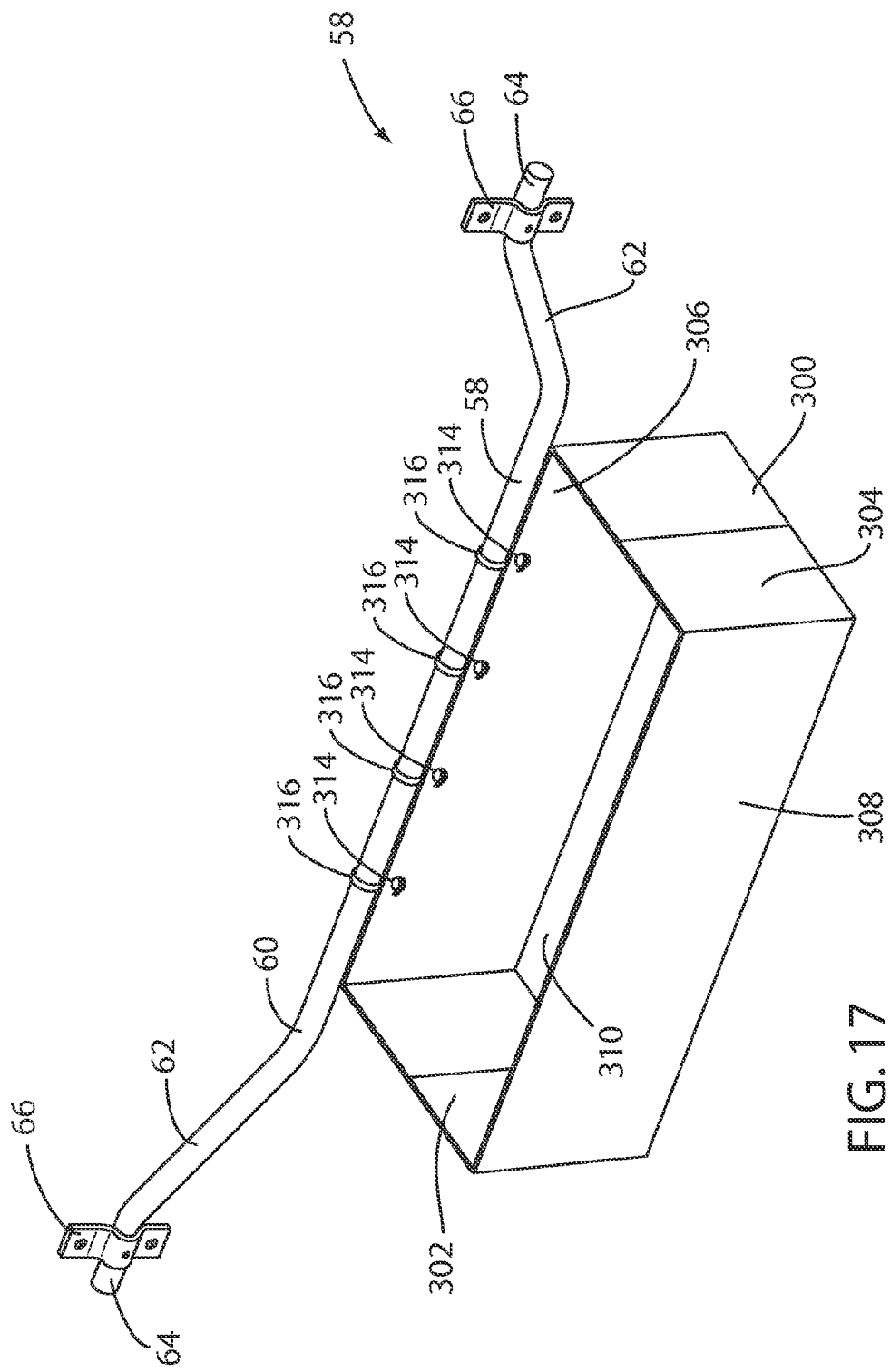
FIG. 17 is a perspective rear view of the luggage retention system and the collapsible storage bin in accordance with the present disclosure with the U-shaped bar in the lowered position and the collapsible storage bin expanded condition and in the deployed position.
Figure 18:
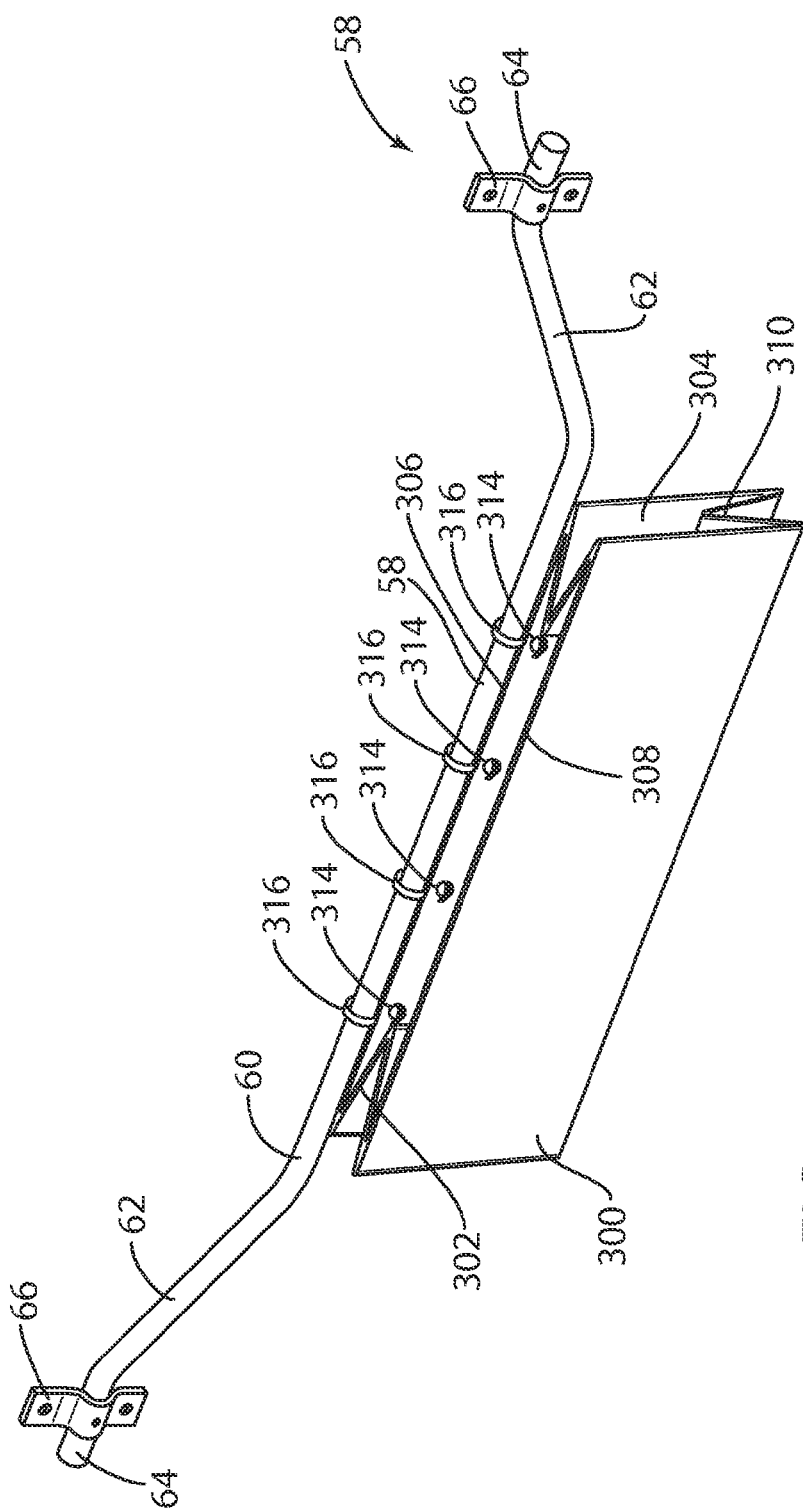
FIG. 18 is a perspective rear view of the luggage retention system and the collapsible storage bin in accordance with the present disclosure with the U-shaped bar in the lowered position and the collapsed collapsible storage bin in the deployed position.

Accordingly, a collapsible storage bin 300 is provided to hold items stored in the trunk 24. The collapsible storage bin 300 is preferably fabricated from lightweight rigid plastic and is mounted to the pivotable bar assembly 56, as shown in FIGS. 17-22, and is movable between an expanded and collapsed condition, as best shown in FIGS. 17 and 18, respectively. As shown in the expanded condition and the deployed position in FIG. 17, the collapsible storage bin 300 has two opposed collapsible side walls 302, 304, two opposed substantially rigid walls 306, 308 and a foldable bottom 310. At least the rigid side wall 306 has an upper edge 312 pivotably attached to the linear central portion 60 of the U-shaped bar 58. Preferably, the upper edge 312 of the rigid side wall 306 includes a plurality of sequential openings 314 through which a plurality of eyehooks 316 pivotably attaches the collapsible storage bin 300 to the circular cross-sectional portion 60 of the U-shaped bar 58. Each of the eyehooks 314 has collar 317 having an opening 318 that fittingly and rotatably receives the circular cross-sectional shape of the linear central portion 60 of the U-shaped bar 58 and a depending hook 320 removably extending from the collar 317 into and through one of the plurality of openings 314 in the upper edge 312 of the rigid side wall 306.

Figure 19:
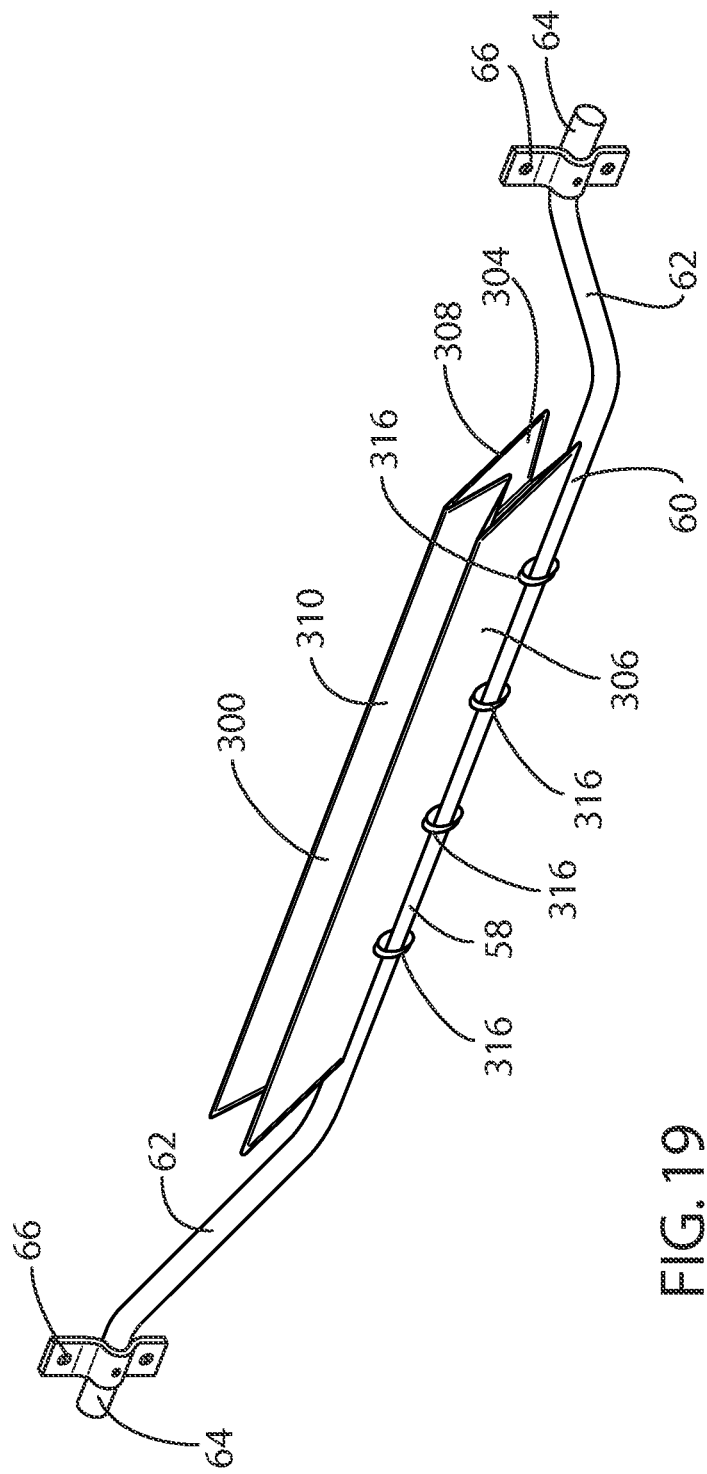
FIG. 19 is a perspective rear view of the luggage retention system and the collapsible storage bin in accordance with the present disclosure with the U-shaped bar in the partially raised position and the collapsed collapsible storage bin in the partially stowed position.
Figure 20:
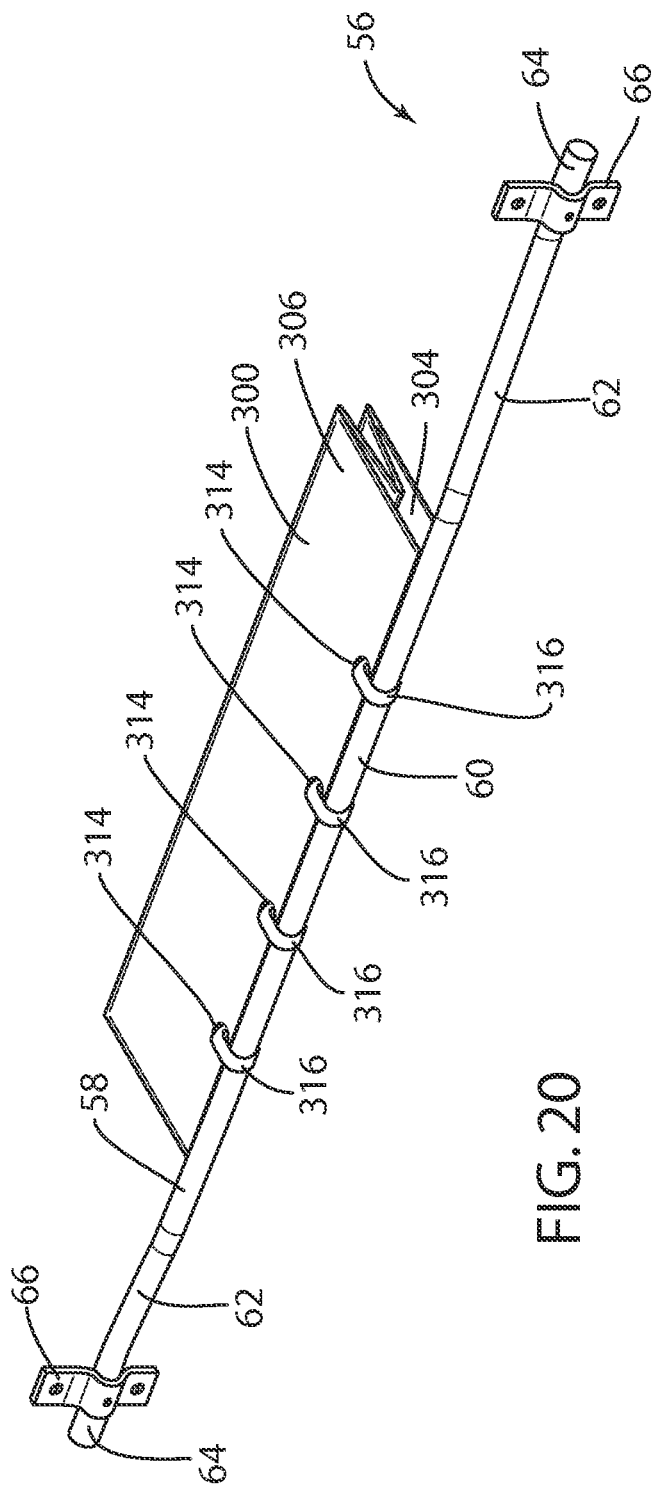
FIG. 20 is a perspective rear view of the luggage retention system and the collapsible storage bin in accordance with the present disclosure with the U-shaped bar in the further partially raised position and the collapsed collapsible storage bin in the further partially stowed position.
Figure 21:
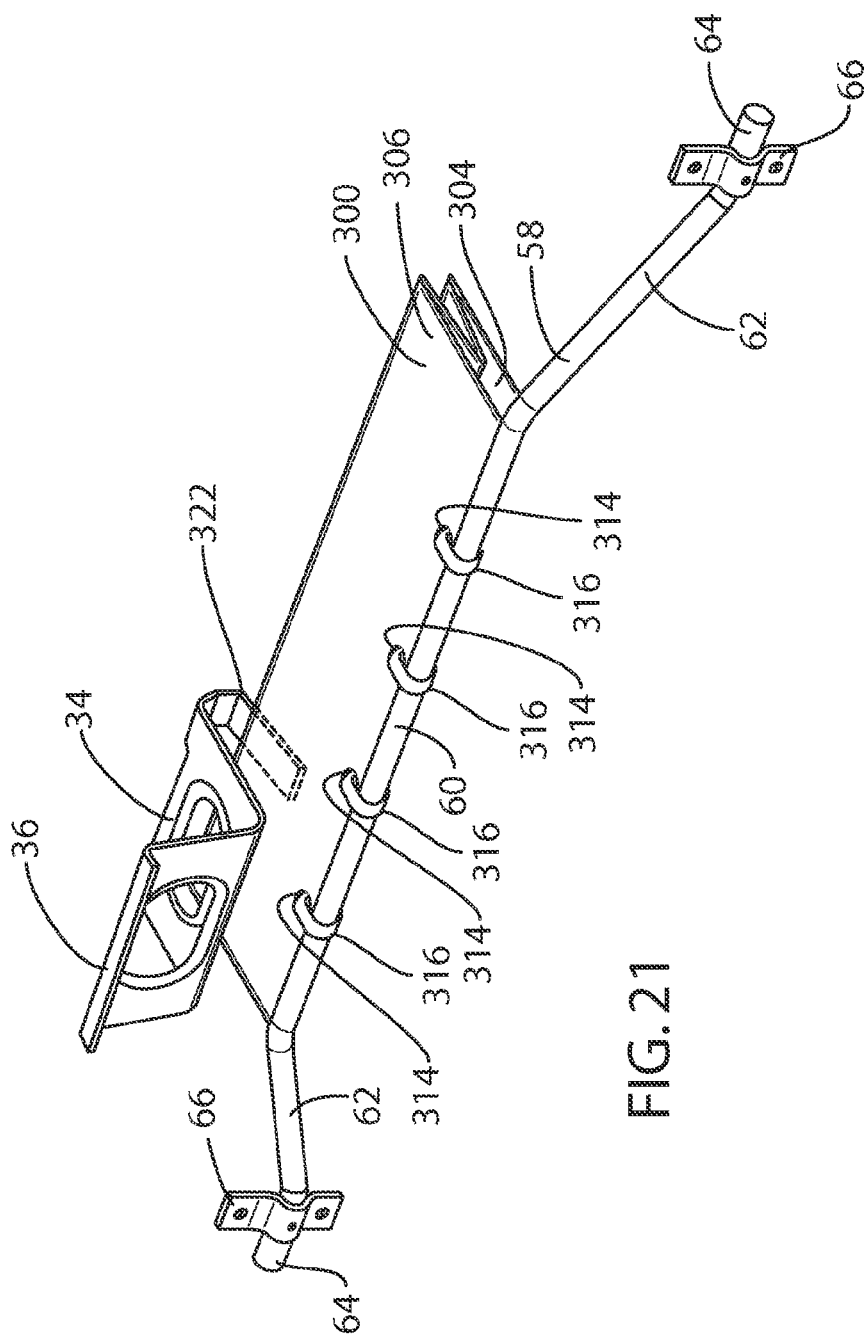
FIG. 21 is a perspective rear view of a motor vehicle incorporating the luggage retention system and the collapsible storage bin in accordance with the present disclosure with the U-shaped bar in the fully raised position and the collapsed collapsible storage bin in the fully stowed position.
Figure 22:
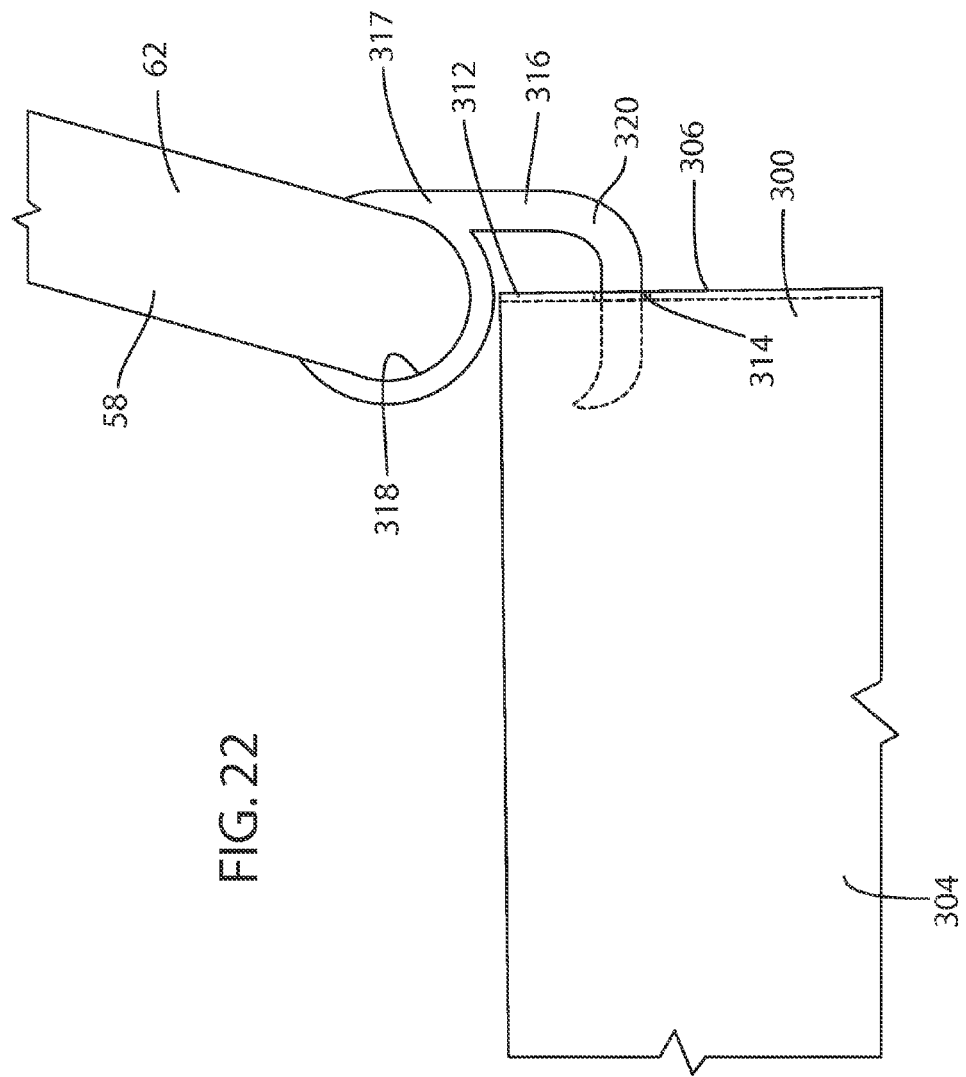
FIG. 22 is a partial side plan view of the luggage retention system and the collapsible storage bin in accordance with the present disclosure with the U-shaped bar in the lowered position.
Figure 23:
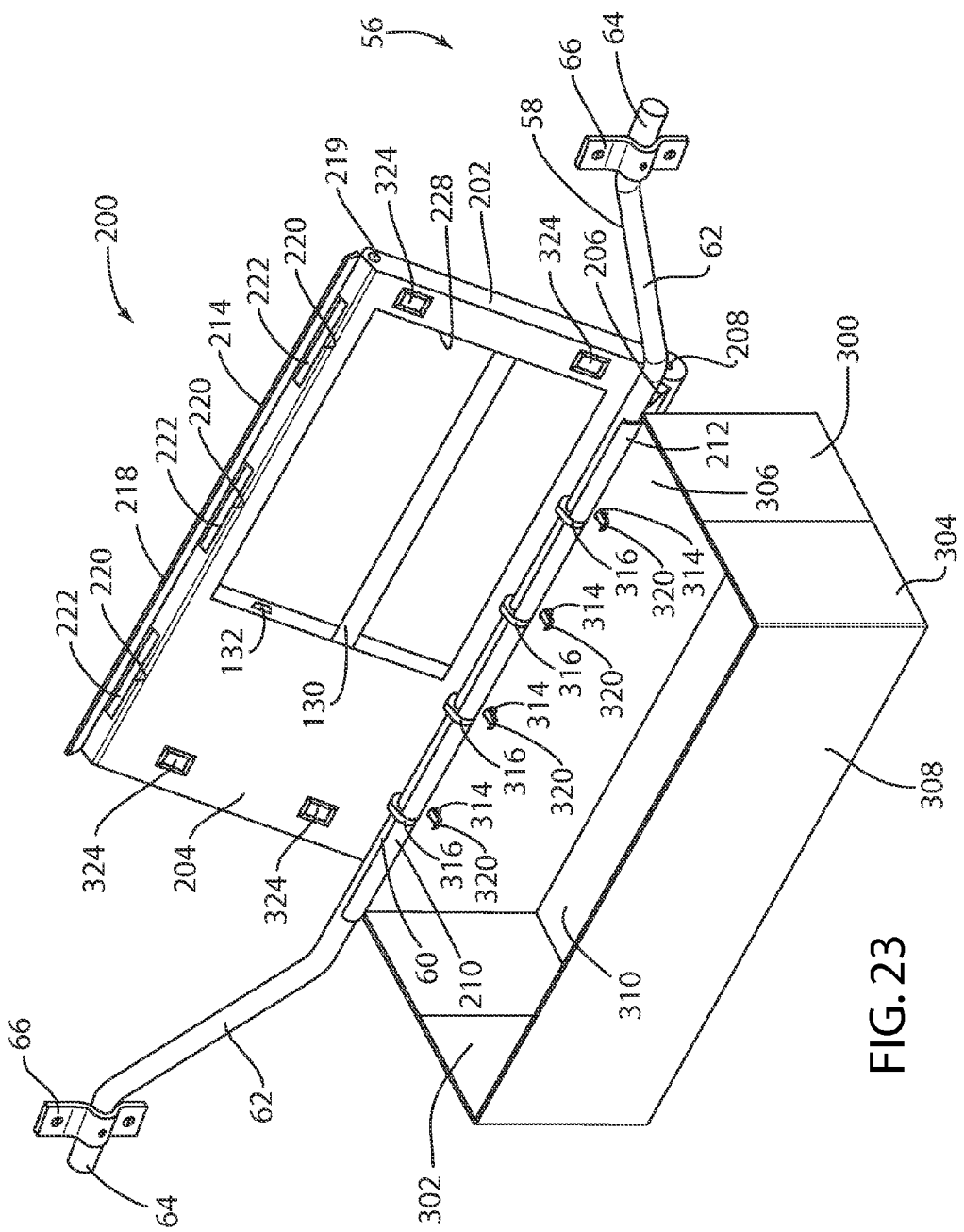
FIG. 23 is a perspective rear view of the luggage retention system, the parcel storage system and collapsible storage bin in accordance with the present disclosure with the U-shaped bar in the lowered position, the parcel storage shelf in the lowered position and the collapsible storage bin in the expanded condition and deployed position.
Figure 24:
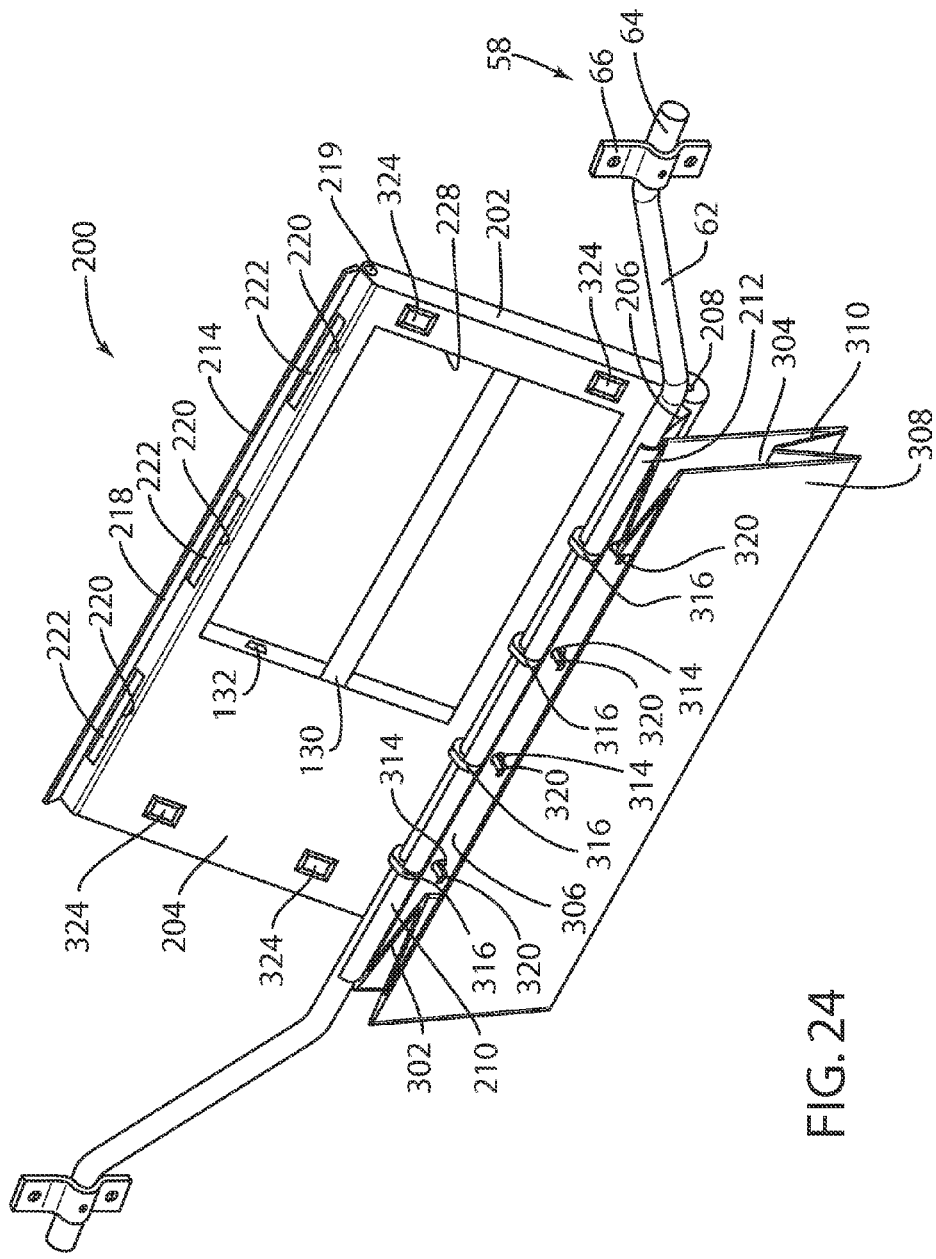
FIG. 24 is a perspective rear view of the luggage retention system, the parcel storage system and collapsible storage bin in accordance with the present disclosure with the U-shaped bar in the lowered position, the parcel storage shelf in the lowered position and the collapsed collapsible storage bin in the deployed position.
Figure 25:
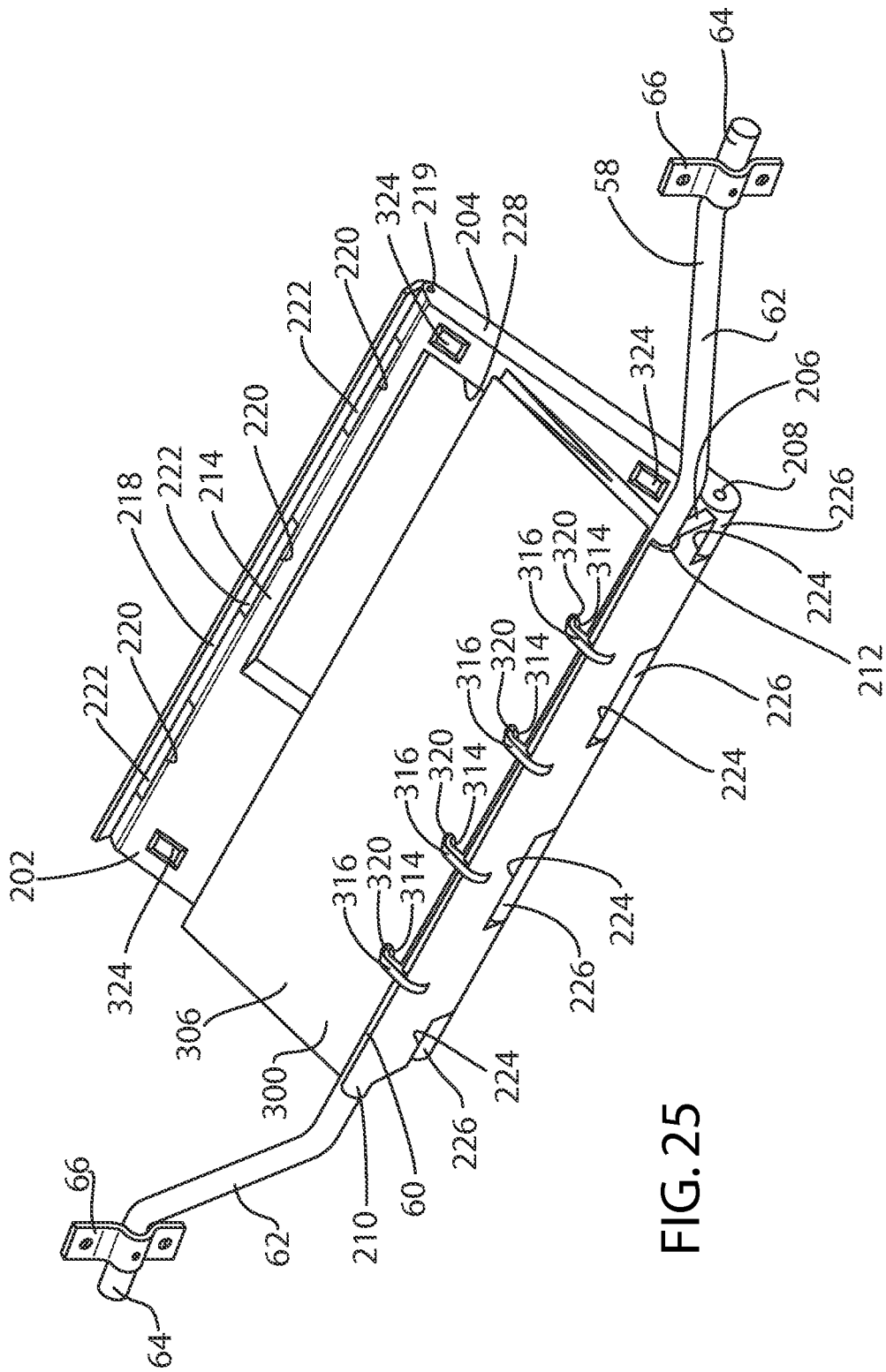
FIG. 25 is a perspective rear view of the luggage retention system, the parcel storage system and collapsible storage bin in accordance with the present disclosure with the U-shaped bar in the partially raised position, the parcel storage shelf in the partially stowed position and the collapsed collapsible storage bin in the partially stowed position.
Figure 26:
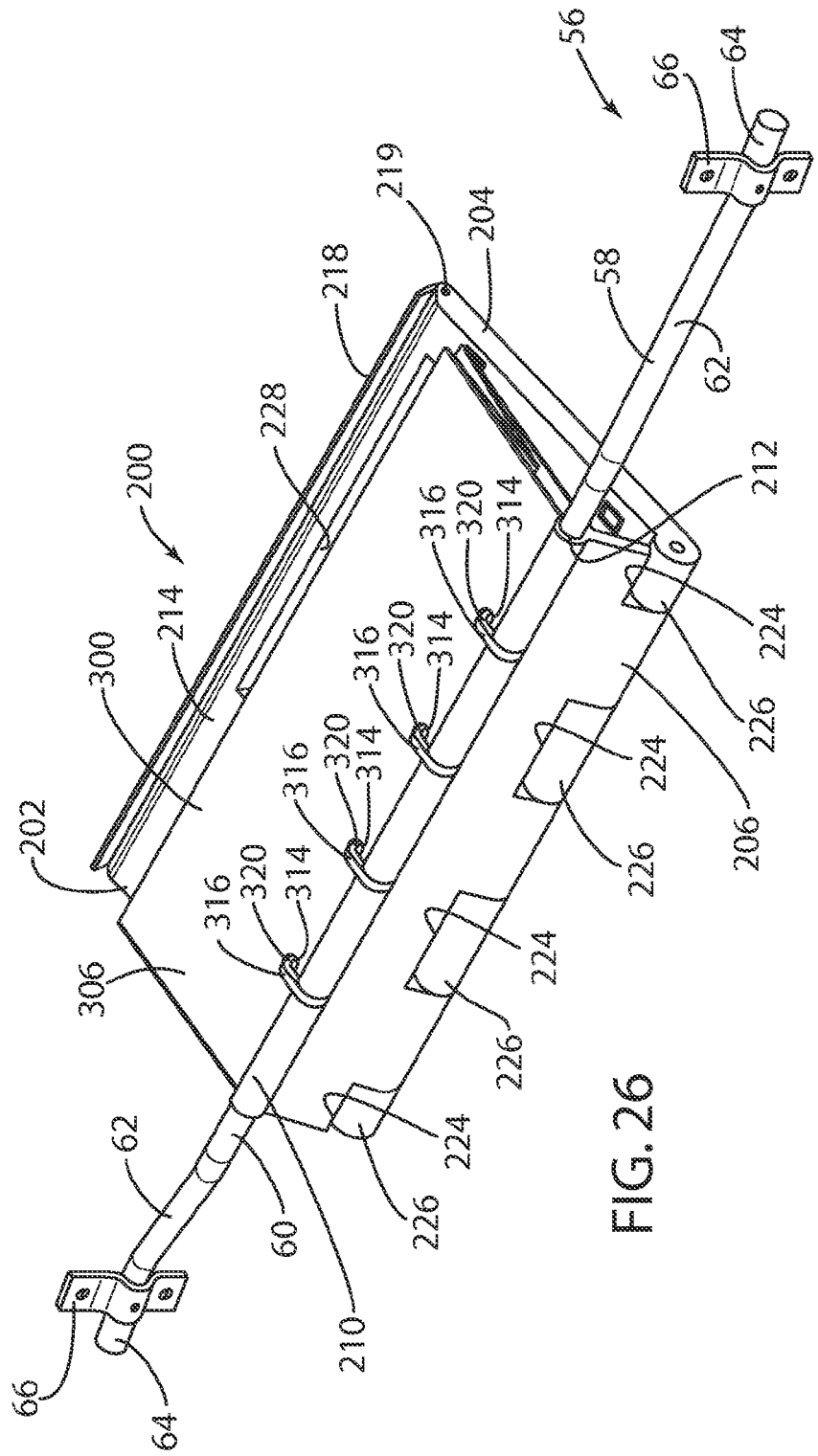
FIG. 26 is a perspective rear view of the luggage retention system, the parcel storage system and collapsible storage bin in accordance with the present disclosure with the U-shaped bar in the further partially raised position, the parcel storage shelf in the further partially stowed position and the collapsed collapsible storage bin in the further partially stowed position.
Figure 27:
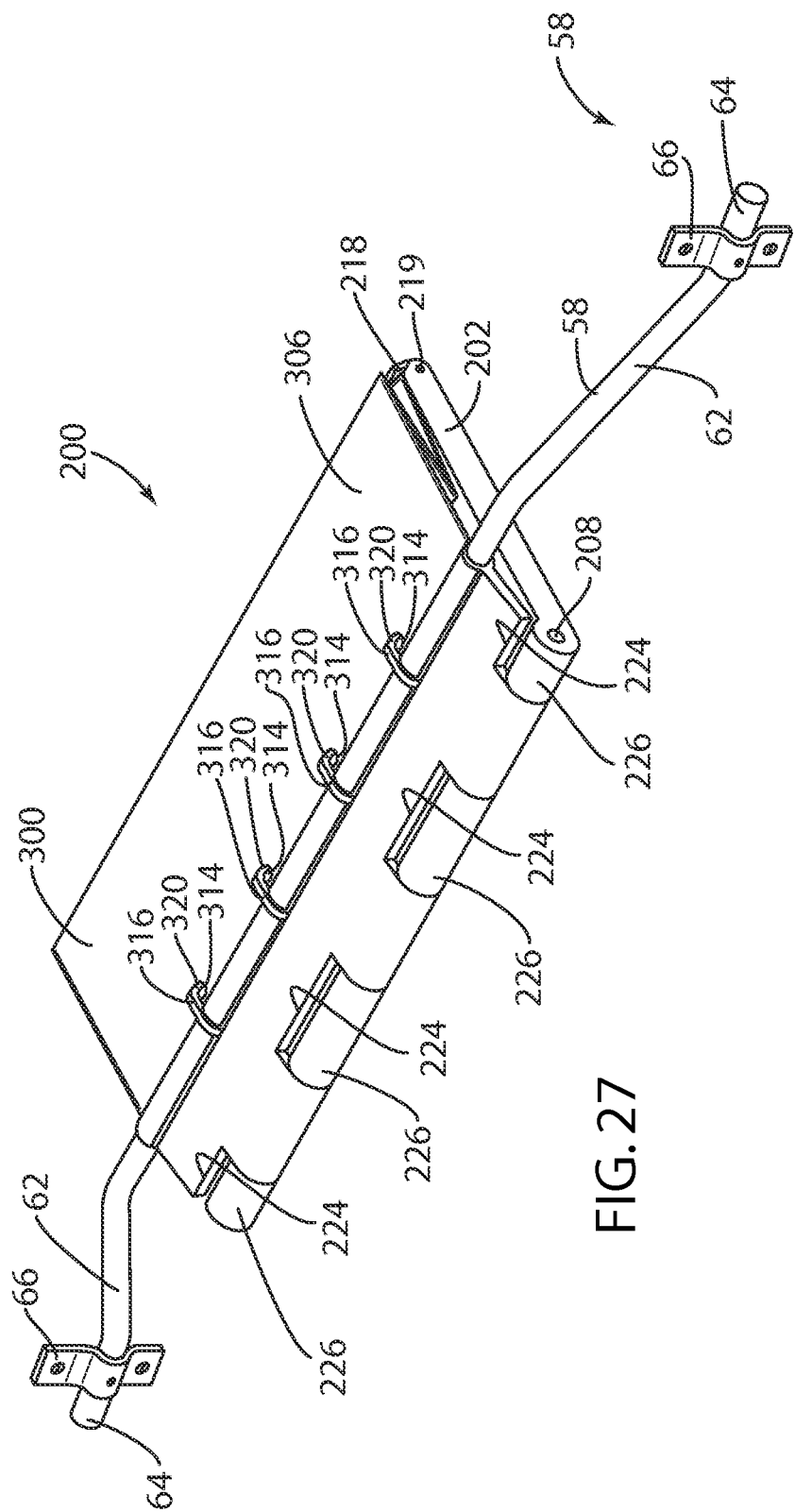
FIG. 27 is a perspective rear view of the luggage retention system, the parcel storage system and collapsible storage bin in accordance with the present disclosure with the U-shaped bar in the fully raised position, the parcel storage shelf in the fully stowed position and the collapsed collapsible storage bin in the fully stowed position.

In operation, with the pivotable bar assembly 56 situated in the lowered position and latched into place by latch 84, the collapsible storage bin can be moved between the expanded and collapsed conditions as desired, as shown in FIGS. 17 and 18, respectively. Moreover, with the collapsible storage bin in the collapsed condition, moving the pivotable bar assembly 56 to the raised position, as shown in FIGS. 19-21, moves the collapsible storage bin 300 from the deployed position to the stowed position, as shown in FIG. 21. Preferably, the U-shaped bar 58 is latched into place by latch 84 and the collapsible storage bin 300 is supported in the stowed position by a tab or clip 322 mounted to the horizontal cross member 36 of the bulkhead 26, as shown in FIG. 21.

Accordingly, in keeping with the present disclosure, the collapsible storage bin 300 in the stowed position also allows full access to the opening 52 and the occupant compartment 20. Preferably, the collapsible storage bin 300 is disposed parallel to and proximate with the horizontal bulkhead cross member 36 in the stowed position. Moreover, by virtue of the removable hooks 320 on the eyehooks 316, the collapsible storage bin 300 may be readily removed from the linear central portion 60 of the U-shaped bar 58 for use as a basket to transport items to and from the motor vehicle 10.

It is a further feature of the present disclosure to combine the parcel shelf 202 with the collapsible storage bin 300, as shown in FIGS. 23 through 28. As can be seen therein, both the parcel shelf 202 and the collapsible storage bin 300 are attached to the linear central portion 60 of the U-shaped bar 58. The parcel shelf 202 is mounted to the pivotable bar assembly so as to be movable between an accessible position when the pivotable bar assembly 56 is in the lowered position and a stowed position when the pivotable bar assembly 56 is the raised position. The collapsible storage bin 300, in the collapsed condition, is also simultaneously moved between its deployed position and stowed position by raising the pivotable bar assembly 56 is the raised position As shown in FIG. 28, with the both the parcel shelf 202 and the collapsible storage bin 300 in the stowed position, both are likewise disposed beneath the horizontal cross member 36 of the bulkhead 26 when the pivotable bar assembly 56 is in the raised position, when each is in the stowed position, thus allowing full access to the opening 52 and the occupant compartment 20. Preferably, the collapsible storage bin 300 is supported by the parcel shelf 202. To this end, the parcel shelf is preferably provided with tabs 324 such that the collapsible storage bin 300 rests on the tabs 324 of the parcel shelf 202 when in the stowed position. Deploying the parcel shelf 202 and the collapsible storage bin 300 is simply the reverse operation, where the collapsible storage bin 300 may be then placed in the expanded condition.

It is to be understood that variations and modifications can be made on the aforementioned structure without departing from the concepts of the present disclosure, and further it is to be understood that such concepts are intended to be covered by the following claims unless these claims by their language expressly state otherwise.

We claim:

1. A storage system for a motor vehicle comprising an occupant compartment having a seat and a trunk rearward of the seat, the occupant compartment and trunk being separated at least partially by a bulkhead cross member, the seat comprising a generally horizontal seating structure and a foldable seat back separating the occupant compartment from the trunk foldable about a pivot, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment;
   a pivotable bar assembly mounted in the trunk having a lowered position and a raised position operatively connected to the foldable seat back for moving the foldable seat back between the upright position and the folded position, wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk;
   a collapsible storage bin mounted to the pivotable bar assembly and movable between an expanded condition and deployed position when the pivotable bar assembly is in the lowered position and a collapsed condition and stowed position when the pivotable bar assembly is the raised position, wherein the collapsible storage bin is parallel to and proximate with the bulkhead cross member in the stowed position, allowing full access to the opening and the occupant compartment; and
   a latch assembly for latching the pivotable bar assembly in at least the lowered position.

2. The storage system of claim 1, wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls, and a foldable bottom, one of the rigid side walls having an upper edge pivotably attached to the linear central portion of the U-shaped bar.

3. The storage system of claim 2, wherein the linear central portion of the U-shaped bar has a circular cross-sectional portion and the upper edge of the one of the rigid side walls further comprises a plurality of sequential openings through which a plurality of eyehooks pivotably attaches the collapsible storage bin to the circular cross-sectional portion of the U-shaped bar.

4. The storage system of claim 3, wherein each of the plurality of eyehooks comprise an opening fittingly and rotatably receiving the circular cross-sectional portion of the U-shaped bar and a depending hook removably extending into and through one of the plurality of openings in the upper edge of the one of the rigid side walls.

5. The storage system of claim 1, wherein the latching assembly latches the U-shaped bar in each of the lowered position and the raised position.

6. A storage system for a motor vehicle comprising an occupant compartment having a seat and a trunk rearward of the seat, the occupant compartment and trunk being separated at least partially by a bulkhead cross member, the seat comprising a generally horizontal seating structure and a foldable seat back separating the occupant compartment from the trunk foldable about a pivot, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment;
  a pivotable bar assembly mounted in the trunk having a lowered position and a raised position operatively connected to the foldable seat back for moving the foldable seat back between the upright position and the folded position, wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk;
  a collapsible storage bin mounted to the pivotable bar assembly and movable between an expanded condition and deployed position when the pivotable bar assembly is in the lowered position and a collapsed condition and stowed position when the pivotable bar assembly is the raised position, wherein the collapsible storage bin has at least two opposed collapsible side walls, two opposed substantially rigid walls, and a foldable bottom, one of the rigid side walls having an upper edge pivotably attached to the linear central portion of the U-shaped bar, and wherein the collapsible storage bin is parallel to and proximate with the bulkhead cross member in the stowed position, allowing full access to the opening and the occupant compartment; and
  a latch assembly for latching the pivotable bar assembly in at least the lowered position.

7. A storage system for a motor vehicle comprising an occupant compartment having a seat and a trunk rearward of the seat, the occupant compartment and trunk being separated at least partially by a bulkhead cross member, the storage system comprising a collapsible storage bin mounted to a pivotable bar assembly disposed aft of a motor vehicle seat back, the pivotable bar assembly having a lowered position moving the collapsible storage bin to an expanded condition and deployed position and a raised position moving the collapsible storage bin to a collapsed condition and stowed position, wherein the collapsible storage bin is parallel to and proximate with the bulkhead cross member in the stowed position, allowing full access to the occupant compartment; and a latch assembly for releasably latching the pivotable bar assembly in the lowered position.

8. The storage system of claim 7, wherein the latching assembly latches the pivotable bar in each of the lowered and raised positions.

9. The storage system of claim 7, wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls and a foldable bottom, one of the rigid side walls having an upper edge pivotably attached to the linear central portion of the U-shaped bar.

10. The storage system of claim 9 further comprising a parcel shelf mounted to the pivotable bar assembly and movable between an accessible position when the pivotable bar assembly is in the lowered position and a stowed position when the pivotable bar assembly is the raised position.

11. The storage system of claim 7 wherein the bulkhead further comprises a horizontal cross member partially separating the occupant compartment from the trunk and wherein the collapsible storage bin is disposed beneath the horizontal cross member when in the stowed position.

12. The storage system of claim 7, wherein the collapsible storage bin is removable from the pivotable bar assembly in the expanded condition and deployed position for use as a basket to transport items to and from the motor vehicle.

13. A storage system for a motor vehicle comprising an occupant compartment and a trunk, the storage system comprising:
  a collapsible storage bin mounted to a pivotable bar assembly disposed aft of a motor vehicle seat back, the pivotable bar assembly having a lowered position moving the collapsible storage bin to an expanded condition and deployed position and a raised position moving the collapsible storage bin to a collapsed condition and stowed position;
  a parcel shelf mounted to the pivotable bar assembly and movable between an accessible position when the pivotable bar assembly is in the lowered position and a stowed position when the pivotable bar assembly is the raised position; and
  a latch assembly for releasably latching the pivotable bar assembly in the lowered position,
  wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls and a foldable bottom, one of the rigid side walls having an upper edge pivotably attached to the linear central portion of the U-shaped bar; and wherein the motor vehicle further comprises a bulkhead having a horizontal cross member partially separating the occupant compartment from the trunk and wherein the parcel shelf and the collapsible storage bin are each disposed beneath the horizontal cross member when each is in the stowed position.

14. The storage system of claim 13, wherein the parcel shelf and the collapsible storage bin in the stowed position allow full access to the opening and the occupant compartment.

15. The storage system of claim 14, wherein the collapsible storage bin rests on the parcel shelf when in the stowed position.

16. A storage system for a motor vehicle comprising an occupant compartment and a trunk, the storage system comprising:
   a collapsible storage bin mounted to a pivotable bar assembly disposed aft of a motor vehicle seat back, the pivotable bar assembly having a lowered position moving the collapsible storage bin to an expanded condition and deployed position and a raised position moving the collapsible storage bin to a collapsed condition and stowed position;
   a parcel shelf mounted to the pivotable bar assembly and movable between an accessible position when the pivotable bar assembly is in the lowered position and a stowed position when the pivotable bar assembly is the raised position, the parcel shelf having a rearward edge; and
   a latch assembly for releasably latching the pivotable bar assembly in the lowered position,
   wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls and a foldable bottom, one of the rigid side walls having an upper edge pivotably attached to the linear central portion of the U-shaped bar; and
   wherein the linear central portion of the U-shaped bar has a circular cross-sectional portion and the rearward edge of the parcel shelf has a resilient C-clip pivotably and releasably engaging the circular cross-sectional portion of the U-shaped bar and the upper edge of the one of the rigid side walls further comprises a plurality of sequential openings through which a plurality of eyehooks pivotably attaches the collapsible storage bin to the circular cross-sectional portion of the U-shaped bar.

17. A storage system for a motor vehicle comprising an occupant compartment and a trunk separated at least partially by a bulkhead having a horizontal cross member, the storage system comprising:
   a collapsible storage bin mounted to a pivotable bar assembly disposed aft of a motor vehicle seat back, the pivotable bar assembly having a lowered position moving the collapsible storage bin to an expanded condition and deployed position and a raised position moving the collapsible storage bin to a collapsed condition and stowed position;
   a parcel shelf mounted to the pivotable bar assembly and movable between an accessible position when the pivotable bar assembly is in the lowered position and a stowed position when the pivotable bar assembly is the raised position, the parcel shelf having a forward edge; and
   a latch assembly for releasably latching the pivotable bar assembly in the lowered position,
   wherein the pivotable bar assembly comprises a U-shaped bar having a linear central portion and a pair of matching ends forming opposed mounting lugs having an axis offset from the linear central portion and a pair of mounting brackets pivotably securing each of the mounting lugs to a pair of mounting plates located in the trunk on opposite sides of the opening between the occupant compartment and the trunk, and wherein the collapsible storage bin has at least two opposed collapsible side walls, two opposed substantially rigid walls and a foldable bottom, one of the rigid side walls having an upper edge pivotably attached to the linear central portion of the U-shaped bar; and
   wherein the forward edge of the parcel shelf is pivotably attached to the horizontal cross member by a piano hinge member, the forward edge of the parcel shelf being provided with a plurality of slots that cooperate with and are received by corresponding knuckles extending from the piano hinge member.

18. A method of storing articles in a motor vehicle having an occupant compartment with a foldable seat back and a trunk rearward of the foldable seat back, the occupant compartment and trunk being separated at least partially by a bulkhead cross member, the foldable seat back forming a seat back for vehicle occupants when in an upright position and the foldable seat back creating a substantially continuous surface with the trunk when in a folded position so as to form an opening between the occupant compartment and the trunk and an extended luggage area that allows for pass-through accessibility from the trunk over the foldable rear seat back and into the occupant compartment, the method including the steps of:
   mounting a pivotable bar assembly in the trunk having a lowered position and a raised position operatively connected to the foldable seat back for moving the foldable seat back between the upright position and the folded position, wherein pivoting the pivotable bar assembly to the lowered position moves the foldable seat back to the upright position and creates a structural safety barrier against objects in the trunk impacting a rear surface of the seat back and pivoting the pivotable bar assembly to the raised position moves the seat back to the folded position to provide uninterrupted access to the occupant compartment from the trunk;
   mounting a collapsible storage bin to the pivotable bar assembly;
   moving the collapsible storage bin between an expanded and collapsed condition when the pivotable bar assembly is in the lowered position;
   moving the collapsible storage bin between a deployed lowered position when the pivotable bar assembly is in the lowered position and a stowed upper position when the pivotable bar assembly is the raised position, wherein the collapsible storage bin is parallel to and proximate with the bulkhead cross member in the stowed position, allowing full access to the opening and the occupant compartment; and latching the pivotable bar assembly in at least the lowered position.

19. The method of claim 18, further comprising the step of latching the pivotable bar assembly when in the raised position.

* * * * *